(12) United States Patent
Byrnes et al.

(10) Patent No.: US 10,132,465 B2
(45) Date of Patent: Nov. 20, 2018

(54) COLLIMATING METALENSES AND TECHNOLOGIES INCORPORATING THE SAME

(71) Applicants: Steve Byrnes, Watertown, MA (US); Francesco Aieta, Cambridge, MA (US); Federico Capasso, Cambridge, MA (US); Alan Lenef, Belmont, MA (US)

(72) Inventors: Steve Byrnes, Watertown, MA (US); Francesco Aieta, Cambridge, MA (US); Federico Capasso, Cambridge, MA (US); Alan Lenef, Belmont, MA (US)

(73) Assignees: OSRAM SYLVANIA Inc., Wilmington, MA (US); The President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 15/922,770

(22) Filed: Mar. 15, 2018

(65) Prior Publication Data

US 2018/0274750 A1    Sep. 27, 2018

Related U.S. Application Data

(63) Continuation of application No. 15/270,680, filed on Sep. 20, 2016, now Pat. No. 9,939,129.

(Continued)

(51) Int. Cl.

| | |
|---|---|
| *F21V 5/04* | (2006.01) |
| *G02B 1/00* | (2006.01) |
| *G02B 5/18* | (2006.01) |
| *H01Q 15/00* | (2006.01) |
| *G02B 27/30* | (2006.01) |

(Continued)

(52) U.S. Cl.
CPC .............. *F21V 5/045* (2013.01); *B82Y 20/00* (2013.01); *F21K 9/64* (2016.08); *F21V 5/002* (2013.01);

(Continued)

(58) Field of Classification Search
CPC ..... G02F 1/3501; G01Q 60/22; H01S 5/3402; H01S 5/4087; H01L 33/507
See application file for complete search history.

(56) References Cited

U.S. PATENT DOCUMENTS

| | | |
|---|---|---|
| 9,298,060 B2 | 3/2016 | Shen et al. |
| 9,391,700 B1 | 7/2016 | Bruce et al. |
| (Continued) | | |

FOREIGN PATENT DOCUMENTS

| | | |
|---|---|---|
| WO | 2011106553 A2 | 9/2011 |
| WO | 2012144997 A1 | 10/2012 |
| WO | 2015112939 A1 | 7/2015 |

OTHER PUBLICATIONS

Hartwig, "Challenges for Reducing the Size of Laser Activated Remote Phosphor Light Engines for DLP Projection", Optomechatronic Micro/Nano Devices and Components III, Oct. 8-10, 2007. Lausanne, Switzerland, Proceeedings of SPIE, (Bellingham, Washington), vol. 9293, Dec. 17, 2014, pp. 929313-1 to 929313-6 (ISBN: 978-1-62841-730-2).

(Continued)

*Primary Examiner* — Andrew Coughlin
(74) *Attorney, Agent, or Firm* — Edward S. Podszus

(57) ABSTRACT

Metalenses and technologies incorporating the same are disclosed. In some embodiments, the metalenses are in the form of a hybrid multiregion collimating metalens that includes a first region and a second region, wherein the hybrid multiregion collimating metalens is configured to collimate (e.g., visible) light incident thereon. In some instances the first region includes an array of first unit cells that contain subwavelength spaced nanostructures, such that the first region functions as a subwavelength high contrast grating (SWHCG), whereas the second region includes an array of second unit cell, wherein the array of second unit cells includes a near periodic annular arrangement of nano- (Continued)

structures such that the second region approximates the functionality of a locally periodic radial diffraction grating. Lighting devices including such metalenses are also disclosed.

20 Claims, 22 Drawing Sheets

Related U.S. Application Data

(60) Provisional application No. 62/265,799, filed on Dec. 10, 2015, provisional application No. 62/222,553, filed on Sep. 23, 2015.

(51) Int. Cl.
*G02B 19/00* (2006.01)
*F21V 5/00* (2018.01)
*F21K 9/64* (2016.01)
*B82Y 20/00* (2011.01)
*F21Y 101/00* (2016.01)

(52) U.S. Cl.
CPC .............. *F21V 5/046* (2013.01); *G02B 1/002* (2013.01); *G02B 1/005* (2013.01); *G02B 1/007* (2013.01); *G02B 5/1809* (2013.01); *G02B 5/1876* (2013.01); *G02B 19/0014* (2013.01); *G02B 19/0052* (2013.01); *G02B 27/30* (2013.01); *H01Q 15/0086* (2013.01); *F21Y 2101/00* (2013.01); *G02B 2207/101* (2013.01)

(56) References Cited

U.S. PATENT DOCUMENTS

| 2009/0296223 | A1 | 12/2009 | Werner et al. |
| 2013/0208332 | A1 | 8/2013 | Yu et al. |
| 2016/0077261 | A1 | 3/2016 | Arbabi et al. |

OTHER PUBLICATIONS

Genevet, "Breakthroughs in Photonics 2013: Flat Optics: Wevefronts Control with Huygens' Interfaces", IEEE Photonics J., (IEEE, USA) vol. 6, No, 2, Apr. 1, 2014, pp. 1-4 (ISBN: XP011546594).
Sigma-Aldrich tech. note, "Materials for High and Low Refractive Index Coatings", downloaded Jul. 2016 at www.sigmaaldrich.com/materials-science/organic-electronics/ri-coatings.html (3 pages).
Mao, "Nanopatterning Using a Simple Bi-Layer Lift-Off Process for the Fabrication of a Photonic Crystal Nanostructure", Nanotechnology 24 (2013), (IOP Pub. Ltd., Feb. 1, 2013), downloaded at iopscience.ipo.org (6 pgs).
Mao & Karlicek, Jr., "Surface Patterning of Nonscattering Phosphors for Light Extraction", Optics Ltrs, vol. 38, No. 15, pp. 2796-2799 (Optical Soc. Amer. Aug. 1, 2013), downloaded at researchgate.net/publication/254260035 (4 pgs).
Sales, "Diffractive-Refractive Behavior of Kinoform Lenses", Applied Optics, vol. 36, No. 1, Jan. 1, 1997 (pp. 253-257).
Yu, "Flat Optics: Controlling Wavefronts With Optical Antenna Metasurfaces", IEEE J. of Selected Topics in Quantum Electronics, vol. 19. No. 3, May/Jun. 2013 (23 pages).
Lo, "New Architecture for Space Telescopes Uses Fresnel Lenses", SPIE Newsroom (The Internat. Soc. for Optical Eng'g., Aug. 9, 2006) numbered "10.1117/2.1200608.0333" (2 pages).
Buralli, "Optical Performance of Holographic Kinoforms", Applied Optics, vol. 28, No. 5, Mar. 1, 1989 (pp. 976-983).
Lu, "Planar high-numerical-aperture low-loss focusing reflectors and lenses using subwavelengh high contrast gratings", Optics Express, vol. 18, No. 12, Jun. 7, 2010, pp. 12606-12614 (9 pgs).
Vo, "Sub-wavelength grating lenses with a twist", IEEE Phot. Tech. Lett., vol. 26, No. 13, Jul. 1, 2014 (pp. 1376-1378).
Yao, "Wide Wavelengh Tuning of Optical Antennas on Graphene with Nanosecond Response Time", Nano Letters 14, 214 (Amer. Chem. Soc. Pubs. 2014) pages marked with letters A to F (6pgs).
Khorasaninejad, "Melalenses at visable wavelenghts: Diffraction-limited focusing and subwavelengh resolution imaging", Science vol. 352, Issue 6290 (Jun. 3, 2016) pp. 1190-1194 (6 pgs w/ abstract).

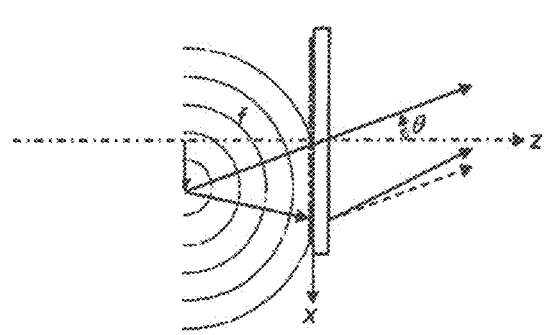 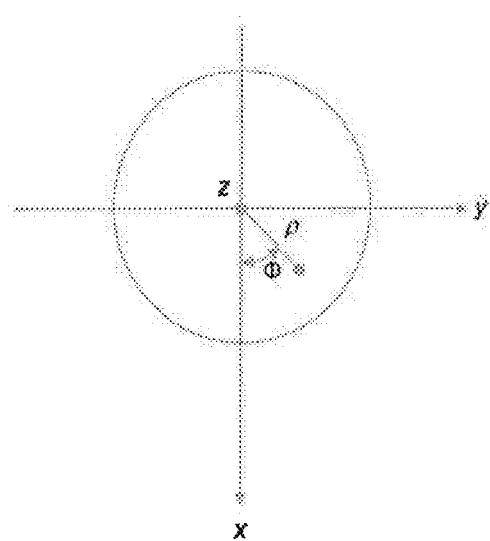
FIG. 21 (a)  FIG. 21 (b)

COLLIMATING METALENSES AND TECHNOLOGIES INCORPORATING THE SAME

CROSS REFERENCE TO RELATED APPLICATIONS

This application claims priority to U.S. application Ser. No. 15/270,680, filed Sep. 20, 2016, which claims priority to U.S. Provisional Application Ser. No. 62/222,553, filed Sep. 23, 2015, and U.S. Provisional Application Ser. No. 62/265,799, filed Dec. 10, 2015, the entire contents of which are incorporated herein by reference.

FIELD

The present disclosure generally relates to optical components and technologies including the same. In particular, the present disclosure relates to collimating metalenses and technologies including the same, such as but not limited to lighting devices.

BACKGROUND

Interest has grown in the use of laser activated remote phosphor (LARP) for technology in various lighting applications, such as automotive, projection, and other lighting applications. One reason for that interest is that LARP technology has the potential to enable to production of lighting devices that can generate significantly higher luminance than devices that utilize light emitting diodes (LEDs), at relatively high power levels.

FIG. 1 depicts one example of a LARP system. As shown, LARP system 100 includes a first light source 101 in the form of a laser. The first light source 101 emits rays 103 of laser light towards a dichroic beam splitter 105. The dichroic beam splitter 105 reflects rays 103 into a collimating optic 107. The reflected rays 103 pass through and are focused by the collimating optic 107 onto a wavelength converter 109 that is present on a substrate 111. The wavelength converter 109 includes a wavelength conversion material that functions to convert (e.g., via photoluminescence) at least a portion of light rays 103 incident thereon to light of a different wavelength than light rays 103, in this case light rays 115. As significant heat may be generated by the conversion of rays 103 to rays 115, a heat sink 113 may be coupled to the substrate 111 so as to facilitate the dissipation or removal of excess heat.

At least a portion of the rays 115 produced by wavelength converter 109 are collected by the collimating optic 107 and are redirected back through the dichroic beam splitter 105, where they are incident on a focusing lens 121. The focusing lens 121 focuses rays 115 on other components 123 of LARP system 100, such as fiber/projection optics.

LARP system 100 may also include an optional second light source 117 (e.g., a laser or non-laser source), as shown. When included the second light source 117 may be used to emit light rays 119 that reflect off of the dichroic beam splitter 105 towards the focusing lens 121. The resultant mixing of rays 119 and rays 115 may result in a corresponding change in the color temperature or other properties of the light in the region down field of the dichroic beam splitter 105.

Using such a configuration tens of watts of laser light (i.e., rays 103) may be pumped into a small (e.g. square-millimeter ($mm^2$) area of wavelength converter 109, resulting in the production of broad or narrow-band emission of secondary light (i.e., rays 115) with a relatively low étendue and a relatively high light output (e.g., from several hundred to above 10,000 lumens). LARP systems such as the one shown in FIG. 1 may therefore considered attractive for many projection applications such as digital micro-mirror (DMD) modulators, fiber optic sources, and the generation of highly collimated beams.

While LARP systems have shown some promise, challenges exist that have limited their practical implementation in various lighting applications. One such challenge is that the wavelength converters used in many LARP systems often produce secondary light in a hemispherical (approximately Lambertian) pattern. For the system to be efficient, the collimating optic in the system needs to be able to capture a large fraction of the hemispherical luminescence produced by the wavelength converter. Capturing sufficient amounts of such light with traditional collimating optics can be difficult, and therefore special non-imaging type optics (e.g., a tapered total internal reflection optic as shown in FIG. 1) or very low F/number aspheric lenses (often more than one) are often used as collimating optics in LARP systems. Those specialized optics are often expensive, heavy, and can take up considerable space. It may also be necessary to place them very close to the surface of the wavelength conversion material (e.g., less than 100-200 microns ($\mu m$)) which can make alignment difficult.

Similar challenges exist with collimating optics used in optical applications outside of the context of a LARP system. For example in some LED projection systems, one or a plurality of non-laser, high luminance LEDs is/are used emit light into a hemisphere after which the emitted light is collimated by one or more collimating optics. One method of collimating the light emitted by an LED is to encapsulate the LED die in a lens. Although encapsulation can improve the light extraction efficiency of the LED, it may undesirably increase the étendue of the LED by a factor of $n^2$, where n is the refractive index of the lens medium. An alternative approach may therefore be needed in instances where maintenance of étendue is desired, such as in light projection systems.

One such alternative approach is to use collimating optics similar to those used in the LARP system of FIG. 1 (either alone or in combination with an encapsulating lens if the increased étendue can be tolerated) to collimate light emitted by an LED. This concept is illustrated in FIG. 2, which depicts one example of a collimation system 200 in which a spatially extended light source 201 (e.g., an LED) emits rays 203 of light towards a collimating optic 205, with the light source 201 being aligned with the optical axis 207 of the collimating optic 205. In such instances, however, the same challenges associated with the collimating optics used in a LARP system (i.e., size, weight, alignment, cost, etc.) are presented.

An interest therefore remains in the development of alternative optics that are suitable for use in various applications such as LARP, high luminance LEDs, point source collimation, laser-based microscopy and other applications in which high numerical aperture collimation is desired. As will be discussed in detail below, the present disclosure generally relates to such alternative optics (and in particular metalenses) which are suitable for those and other applications.

BRIEF DESCRIPTION OF THE DRAWINGS

FIGS. 21(a) and 21(b) depicts the use of a metalens consistent with the present disclosure for collimating an off-axis light source.

DETAILED DESCRIPTION

Figure 1:
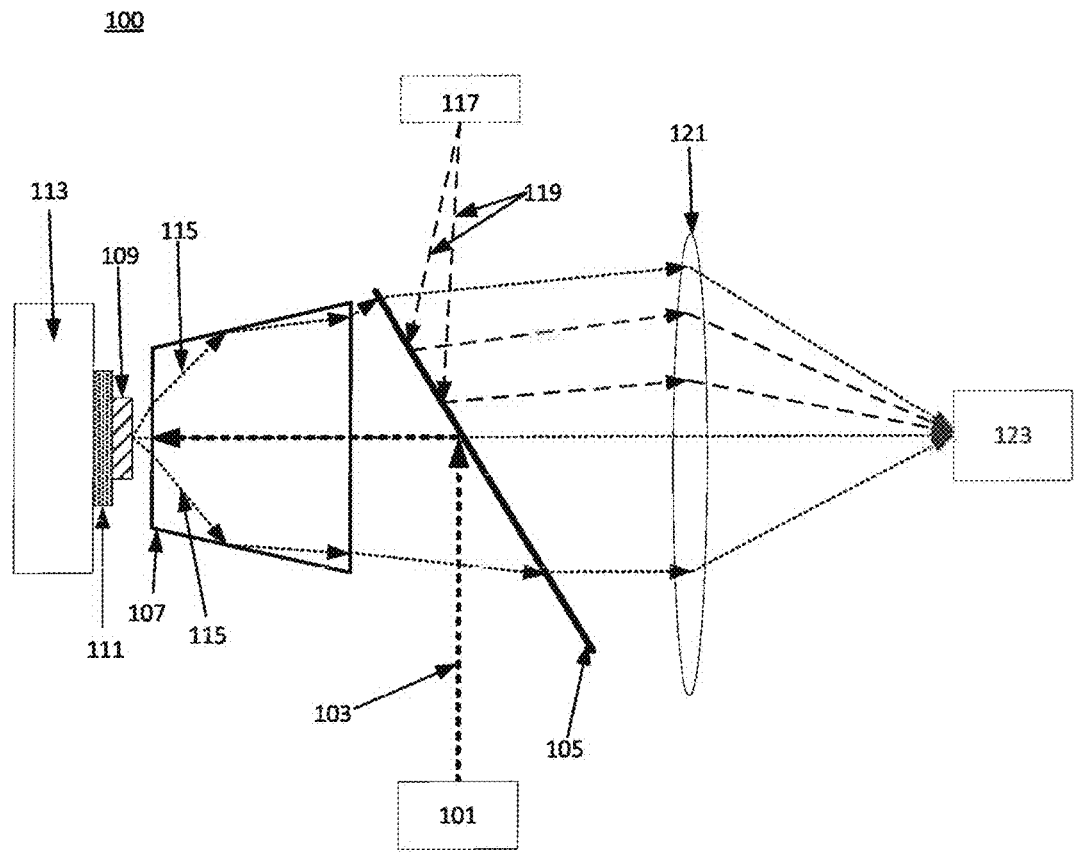
FIG. 1 depicts one example of a prior art laser assisted remote phosphor (LARP) system.
Figure 2:
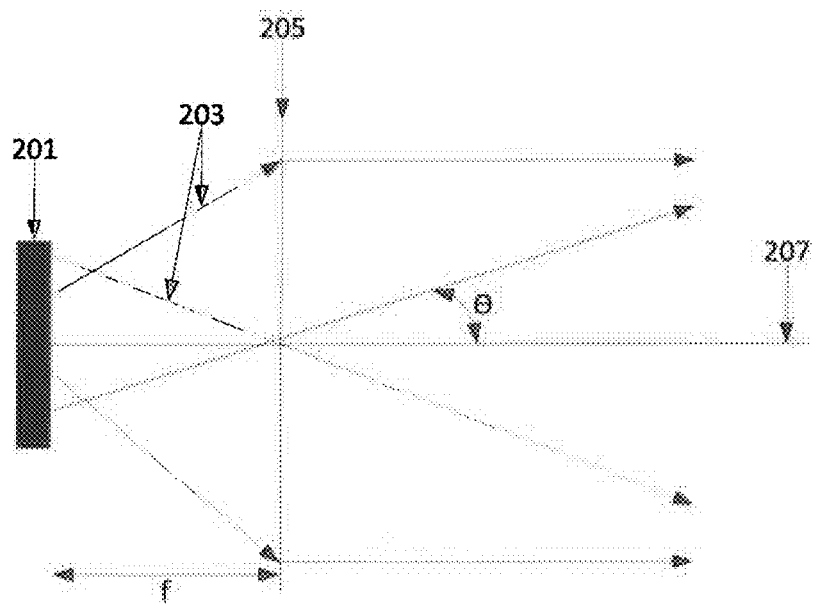
FIG. 2 depicts one example of a prior art light emitting diode (LED) collimation system.

As noted in the background, specialized collimating optics may be used in various optical applications such as LARP, LED collimation, etc., to collimate light that is emitted from a light source in a distributed (e.g., hemispherical) pattern. To be efficient, the collimating optics used therein need to capture a large fraction of the light produced by the light source. Although that can be accomplished by using special non-imaging type optics (e.g., a tapered total internal reflection optic as shown in FIG. 1) or very low F/number aspheric lenses (often more than one) as the collimating optic, such optics present various challenges which have limited their practical implementation in various applications such as LARP, LED collimation, etc. In particular, those optics present size, weight, and alignment constraints that make it practically difficult to implement LARP and LED collimating technology in compact lighting applications such as automotive lamps, compact lighting fixtures, compact projection systems, and the like. Efforts have therefore been made to reduce the size, cost, and/or weight of collimating optics, so as to facilitate the implementation of LARP and LED collimating technology in those lighting applications.

The inventors have considered various options for replacing the specialized collimating optics often used in LARP and LED collimation systems. One option that has been considered is the Fresnel lens. Although Fresnel lenses are well understood optical designs, practically implementing a Fresnel lens that exhibits desirable properties for LARP, high luminance LED, and point source collimation has proven challenging. Indeed while it is theoretically possible to design a Fresnel lens that exhibits suitable properties for such applications, physically producing such lens can be practically difficult. Indeed the production of Fresnel lenses often entails the use of precision molding and polishing to achieve high quality focusing and/or collimation, particularly when environmental considerations encountered in LARP and/or LED collimation (e.g., exposure to high heat and high short wavelength fluxes) dictate the use of glass as a lens material, instead of plastic. Fresnel lenses can therefore be difficult and expensive to produce, and are often not cost effective for a variety of applications. Some Fresnel lens designs also can give rise to optical artifacts, scattering loss, and aberrations, particularly if the lens is designed to have a short focal length, a feature that is often desired in collimating optics for LARP and LED collimation.

Flat diffractive optics have also been considered as an option for replacing the specialized collimating optics used in LARP, LED collimation, and other applications. For example, it is possible to design a flat diffractive optic that induces a spatially dependent phase modulation on light incident thereon, e.g., by designing the optic such that the phase change induced at its surface only needs to vary between 0 and 2π to achieve a desired wave front. Such optics can be produced using various approaches, such as with a zone plate, the diffractive limit of a Fresnel lens, or kinoform. Lithography, photo curing, and effective medium approaches may also be leveraged to produce a desired phase change. However all of those options can present significant fabrication challenges in the context of producing a lens that exhibits properties that may be considered desirable for application in LARP and/or LED collimation.

With the foregoing in mind, the inventors have identified metasurface lenses (hereinafter, "metalenses") as a class of optics that may be advantageously leveraged as a replacement for the collimating optics used in various challenging optical applications, such as LARP, LED collimation, and laser based spectroscopy.

As used herein, the terms "metasurface lens" and "metalens" are used interchangeably to refer to a lens that bends light with an array of nanostructures that are formed on a (ideally flat) surface of a substrate, instead of via refraction. More specifically, a metalens includes a metasurface that includes an array of nanostructures, wherein the nanostructure array is configured to bend light incident thereon by altering its phase. As will be described, the phase change imparted by the metasurface can create a new wave front in a region down field of the lens. For example, a metalens consistent with the present disclosure can include an array of nanostructures that can impart a phase change to incident light having a spherical or hemispherical wave front up field of a lens, such that the light in a region down field of the lens has a planar wave front (i.e., a plane wave).

As used herein the term "point light source" refers to a light source that is an ideal infinitesimal region that emits a spherical or hemispherical wave of light. Single mode optical fiber light sources are one example of a light source that can approximate a point light source. With that in mind, the present disclosure discusses the use of metalenses in the context of certain applications such as LED collimation and wavelength converted LARP. Such applications utilize one or more LEDs and/or a wavelength converter (e.g., a ceramic phosphor plate) which are extended sources which emit from a finite area. In those contexts, one can consider an LED or a wavelength converter to be an incoherent superposition of ideal point sources which cover the emitting area of the extended source. Moreover due to the small physical size of a wavelength converter in LARP or a high luminance LED source in an LED collimator, one may consider them to be close to a point source from the geometric optics point of view, provided that all other length scales in the optical system are much larger than the source sizes.

In the context of the present disclosure, the term "on," when used in the context of describing a positional relationship between components, means that a first component is disposed above a second component, but is not necessarily in direct contact with the second component. In contrast, the term "directly on," when used in that same context means that a first component is in direct contact with the second component.

As used herein the term "about" when used in connection with a value or a range, means +1-5% of the indicated value or the endpoints of the indicated range. It is noted that while ranges may be specified herein by specific endpoints, such ranges should be understood to a shorthand version of writing all of the numerical values within that range. Thus for example, a range of 1-10% should be understood to all of the numerical values within that range (i.e., 1, 2, 3, 4, etc.), as well as all ranges that may be defined by two or more values within than range (e.g., 2-10%, 3-10%, 4-8%, etc.) as though such values and ranges were explicitly recited.

Figure 3A:
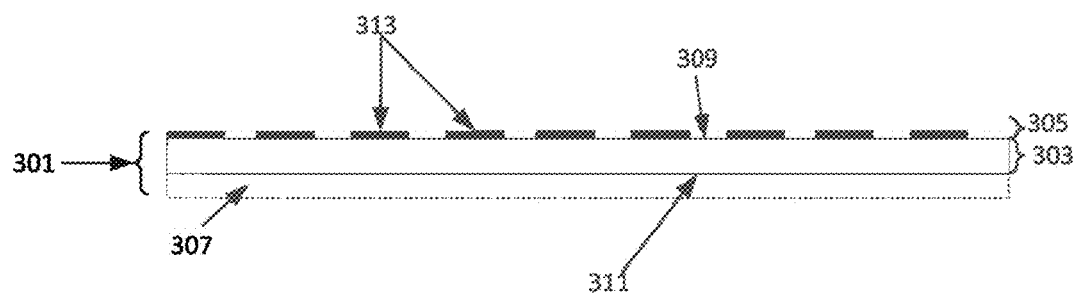
FIG. 3A depicts a generalized cross sectional structure of one example of a metalens consistent with the present disclosure.

FIG. 3A depicts one example of a generalized cross sectional structure of a metalens structure consistent with the present disclosure. As shown, metalens 301 includes a substrate 303 having a first side 309 and a second side 311. A metasurface 305 is formed on the first side 309 of the substrate 303. In some embodiments, an optional antireflective coating 307 is formed on the second side 311 of the substrate 303. As discussed herein the metasurface 305 includes an array of nanostructures 313, which are generally configured to impart a phase change to light incident thereon.

Substrate 303 generally functions to support other elements of metalens 301, such as but not limited to metasurface 305 and optional antireflective coating 307. The substrate 303 may also be selected to transmit a suitable amount of light of a desired wavelength or wavelength range, such as one or more wavelengths in the visible region of the electromagnetic spectrum (i.e., from about 400 to about 700 nanometers). Without limitation, in some embodiments the substrate 301 is configured such that it transmits greater than or equal to about 50%, 60%, 70%, 80%, 90%, 95%, 99%, or even about 100% of light in the visible region of the electromagnetic spectrum. Without limitation, in some embodiments substrate 303 transmits greater than or equal to about 95% of visible light incident thereon.

Substrate 303 may be formed from any suitable material, provided that it can adequately transmit light in a desired wavelength or wavelength range (e.g., visible light) and can serve as an adequate support for metasurface 305 and (where used) optional antireflective coating 307. In some embodiments, the material of substrate 301 has a refractive index that is relatively low, as compared to the refractive index of materials used in metasurface 305. Non limiting examples of suitable transparent materials that may be used as substrate 303 include aluminum oxide ($Al_2O_3$) silicon dioxide ($SiO_2$), polymers, combinations thereof, and the like. Such materials may be crystalline or amorphous (glassine). Glasses may be desirable because of cost, ease of polishing, and lack of birefringence.

Metasurface 305 generally functions to alter the phase of light that is incident thereon, such light down field of the lens (relative to the light source) has a desired distribution and/or wave front. For example, in some embodiments metasurface 305 is configured to convert light having a first wave front (e.g., a spherical, hemispherical, etc.) in an region up field of the lens to light having a second (e.g., planar) wave front in a region down field of the lens.

Figure 3B:
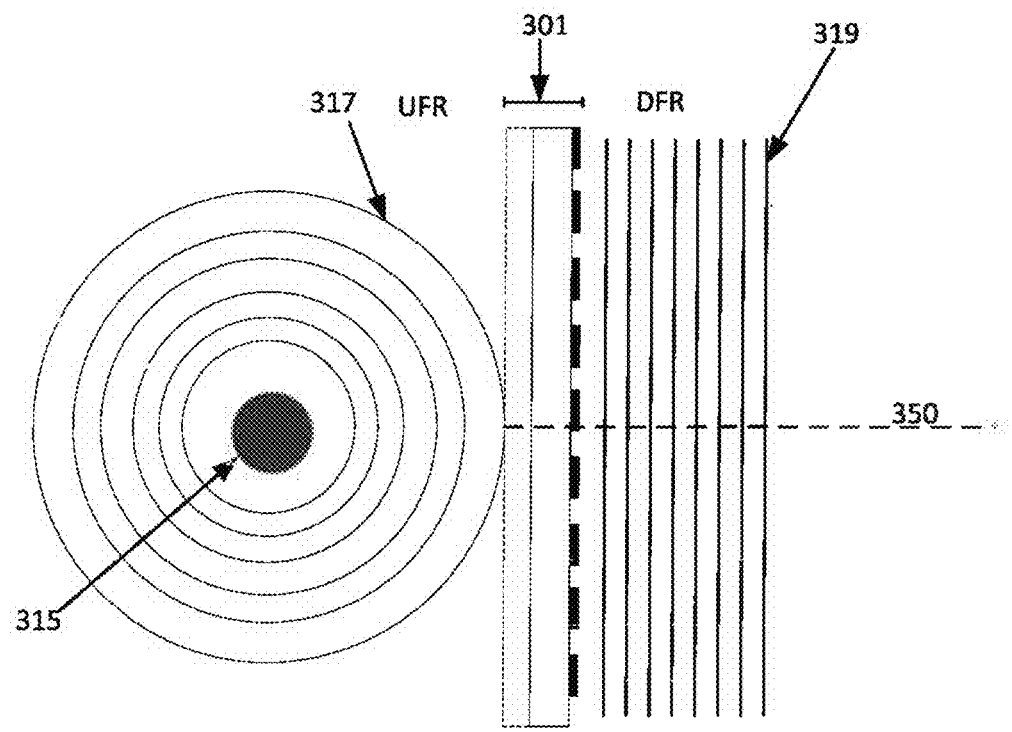
FIG. 3B is a generalized illustration of the conversion of light having a first wave front up field of a metalens to light having a second wave front down field of the metalens.

FIG. 3B illustrates a generalized example of that concept. As shown in that figure, a metalens 301 is positioned proximate to a point light source 315, such as a wavelength converter used in LARD, an LED, or the like. Regardless of its specific form, point light source 315 emits light in a hemispherical wave front towards one side of metalens 301, i.e., in a region up field (UFR) of metalens 301. The light in the UFR may therefore be understood to have a spherical or hemispherical wave front 317. Light incident on metalens 301 propagates through substrate 303 and is incident on metasurface 305 or, more particularly, on an array of nanostructures 313 in metasurfacc 305. As shown in this simplified example, the nanostructures 313 of metasurface 305) convert the incident spherical wave front 317 into light having a planar wave front 319 in a region down field (DFR) of metalens 301. In that way, metalens 301 can produce a collimated light beam of parallel light rays from an incident spherical or hemispherical wave front.

When used, the optional antireflective coating 307 generally functions to reduce reflection of light that is incident on or which is exiting from metalens 301 depending on whether the incident light enters on the substrate side (i.e., side 311) or the metalens side (i.e., side 309). It is noted that while FIG. 3A depicts an embodiment of a metalens 301 in which optional antireflective coating 307 is disposed on the second side 311 of substrate 303 (i.e., opposite the first side 309 bearing the metasurface 313), use of the optional antireflective coating 307 on the second side 311 is not required. For example, in some embodiments the optional antireflective coating 307 is disposed on (e.g., directly on) the metasurface 305. In any case, a variety of materials may be used as or in optional antireflective coating 307. Non-limiting examples of such materials include transparent dielectric materials, such as but not limited to $SiO_2$, $TiO_2$, $MgF_2$, $Ta_2O_5$, $Nb_2O_5$, combinations thereof, and the like.

Returning to the metasurface 305, the nanostructures 313 in metasurface 305 are generally configured to function as resonators or waveguides that impart a phase change to light incident thereon. In that way, the nanostructures 313 can convert light having a first wave front in a region up field of the metalens 301 to light having a second wave front in a region down field of the metalens 301. For example, nanostructures 313 can impart a phase change to light in an incident hemispherical wave front 317, so as to produce light having a planar wave front 319 (i.e., collimated light) in a region down field of metalens 301.

It is noted that while FIG. 3B depicts metasurface 305 down field of the incident spherical wave front 317 (i.e., further from the point light source 315), such a configuration is not required and metasurface 305 may be present on the other or both surfaces of substrate 301. For example, metasurface 305 in some embodiments may be present on both sides of substrate 301, like a biconvex lens, in which the collimating power of the metalens 301 may be divided between the two metasurfaces.

Metasurface 305 includes or is formed from an array of nanostructures 313. In general, nanostructures 313 are in the form of nanoscale features that are formed on (e.g. directly on) or are integral with a surface of substrate 301. As used herein, the term "nanoscale" when used in connection with a feature means that the dimensions of the features are less than 1 micron. In general, the dimensions of the nanostructures 313 will scale with the shortest wavelength of interest. In the context of the present disclosure, which is largely directed to visible light applications for metalenses, the largest linear dimension of the nanostructure in the plane of the substrate surface (e.g., length, width) is less than or equal to 500 nanometers (nm), such as less than or equal to 150 nm, or even less than or equal to 100 nm. Without limitation, in some embodiments the nanostructures 313 described herein are nanoscale structures formed on a surface of substrate 301, and have a longest linear dimension of about 100 to about 200 nanometers. In some instances the largest linear feature size of nanostructures 313 is their height relative to the surface of substrate 303 proximate the nanostructure 313 in question. In such instances the height of the nanostructures 313 may be less than or equal to 1000 nm, such as less than or equal to 600 nm. It noted however that the height of the nanostructures is not limited to those ranges, and that their height may be larger than 1 micron if desired.

The distance (i.e., "period" or "fundamental period") between adjacent nanostructures 313 in the metasurfaces may vary widely, and may be selected during the design of metalens 301 to facilitate the attainment of a desired phase change at a particular portion of the lens. Without limitation, in some embodiments the period between adjacent nanostructures 313 ranges from about 50 to about 1000 nanometers (nm), such as from about 100 to about 500 nm, about 100 to about 300 nm, or even about 100 to about 200 nm. In some embodiments the period between adjacent nanostructures 313 in metasurface 305 is greater than or equal to 100 nm to facilitate production of metasurfaces 305 via lithographic or other techniques. In instances where nanostructures are included in a Bravais lattice (e.g., a hexagonal Bravais lattice) formed by unit cells containing a plurality of nanostructures, the period of the nanostructures may correspond to one or more lattice parameters of the unit cell(s) used to form the lattice.

For the sake of clarity and ease of understanding, the present disclosure will describe various examples of metalenses that include nanostructures 313 in the form of cylindrical pillars that are formed on the surface of a substrate 301. It should be understood that the use of cylindrical pillars is for the sake of example only, and that nanostructures 313 are not limited to a cylindrical pillar shape. Indeed, the shape of the nanostructures described herein can vary considerably. For example, the metasurfaces described herein may include an array of nanostructures 313, wherein the nanostructures are in the form of cylindrical pillars, ellipsoidal pillars, spheres, rectangular prisms, other scattering structures, or the like. When the nanostructures described herein are in the form of pillars, such pillars may have one or more than one side. Examples of such pillars include cylindrical (one sided) pillars, triangular (three sided) pillars, quadrilateral (four sided pillars), pentagonal (five sided) pillars, and the like.

As noted previously the dimensions of the nanostructures described herein may vary considerably. For example in some embodiments the metasurfaces described herein include an array of nanostructures, wherein the height of such nanostructures is fixed or variable across the entirety or a portion of a metalens. In any case, the height of the nanostructures may be in the range of from about 50 to about 2000 nm, such as about 100 nm to about 600 nm, or even about 100 to about 200 nm. In some embodiments, the height of the nanostructures is greater than 100 nm. Of course such ranges are enumerated for the sake of example only, and the nanostructures herein may be of any suitable height.

The lateral size of the nanostructures described herein may also vary considerably. For example in instances where the nanostructures are in the form of cylindrical nanoscale pillars, such pillars may have a center and a radius extending from the center to an outer wall of the pillar. The radius of such pillars may range, for example, from about 25 to about 500 nm, such as from about 50 to about 250 nm, or even about 50 to about 100 nm. Without limitation, in some embodiments the nanostructures are in the form of cylindrical pillars having a diameter of greater than or equal to about 50 nm. Similarly in instances where the nanostructures include or are in the form of multisided pillars or other geometric shapes, such structures may have a lateral length (i.e., a longest linear dimension as measured between opposing sides of a nanostructure) ranging from about 50 to about 2000 nm, such as about 100 nm to about 600 nm, or even about 100 to about 200 nm. Of course such ranges are enumerated for the sake of example only.

A wide variety of materials may be used to form the nanostructures 313. In some instances, it may be desirable to select the materials for forming the nanostructures 313 based on the wavelength(s) of light that will be incident on the metalens 301 in a target application. When a target application involves using the metalens 301 to impart a phase change to visible light, for example, it may be desirable to form the nanostructures 313 from one or more materials that interact with visible light. Non-limiting examples of such materials include high refractive index, low loss dielectric materials such as dielectric oxides ($TiO_2$, $Nb_2O_5$, $Ta_2O_5$, ZnO), carbides (e.g., SiC), diamond, sulfides (e.g., ZnS, CdS, and/or nitrides (e.g., AlN). Alternatively or additionally, the nanostructures 313 may be formed from or include one or more high-index polymers (n>1.6), such as but not limited to silicones and/or acrylics. Polymers with even higher index may also be used, and may be formed, for example, by highly loading a polymer matrix with nanoparticles that have a refractive index of greater than or equal to 1.8, or even greater than or equal to 2. In some embodiments, the materials used to form the nanostructures 313 are transparent to light in the region of interest (e.g., visible light), and exhibit an absorptivity of less than 100/mm.

The nanostructures described herein are not limited to a single material, and may be formed from more than one material. For example, the nanostructures may include two or more of the above noted materials, wherein alternating layers (or other configurations) of such materials are used to "build up" a nanostructure on the surface of a substrate. Lithographic and other techniques to produce such structures are well understood.

The refractive index of the materials used to form the nanostructures 313 may impact their performance for a given application. It may therefore be desirable to select materials for forming the nanostructures 313 based on their refractive index. In that regard, in some embodiments the nanostructures 313 may be formed from or include dielectric or other materials having an refractive index that is greater than or equal to about 1.5, 2.0, 2.3, 2.5, 2.7, or more. Without limitation, in some embodiments nanostructures 313 are formed from or include dielectric materials having a refractive index greater than or equal to 2. Non-limiting examples of such materials include those mentioned above.

The relationship between the refractive index of nanostructures 313 and substrate 303 may also affect the performance of metalens 301. It may therefore be desirable to select the materials used to form substrate 303 and nanostructures 313 such that they have a particular refractive index relationship. In that regard the refractive index of the nanostructures 313 may be greater than, less than, or equal to the refractive index of substrate 303. Without limitation, in some embodiments the refractive index of nanostructures 313 is greater than the refractive index of substrate 303. It is noted, that by using nanostructures 313 that have a refractive index greater than the refractive index of substrate 303, it is possible to reduce or minimize the amount of high angle scattered light that may be trapped in then substrate 303 due to total internal reflection. Moreover, selecting the materials of the substrate 301 and the nanostructures 313 formed thereon such that there is a large difference in the refractive index of the nanostructures 313 and the substrate 301 can also be beneficial, as it can provide some resonance or cavity enhancement effects within the nanostructures 313, resulting in the production of larger phase shifts for a given length.

The microstructure of the materials used as nanostructures 313 may also have an impact on their optical performance. For example, in some instances the microstructure of the materials used to form nanostructures 313 may give rise to artifacts in light down field of the lens. Alternatively or additionally, the microstructure of the materials of nanostructures 313 can cause anisotropic propagation of light through metalens 301. It may therefore be desirable to select materials for use as nanostructures 313 based on their microstructure. For example, it may be desirable to use amorphous or cubic materials (e.g., amorphous $TiO_2$, cubic ZnO), so as to control anisotropic propagation effects in metalens 301. Of course, it is not necessary to use amorphous or cubic materials to form nanostructures 313, and materials with other microstructures may also be used. It is noted that nanostructures consistent with the present disclosure need not have a uniform (i.e., single) nanostructure, and that such structures may include a composite, random, or other complicated microstructure, as desired. However, the materials used to form the nanostructures 313

In specific non-limiting embodiments, metalens 301 includes a substrate 303 formed from quartz, silica ($SiO_2$) or alumina ($Al_2O_3$), and the nanostructures 313 are formed from or include titanium dioxide ($TiO_2$) or zinc oxide (ZnO). In further examples the substrate 303 is formed from quartz, $SiO_2$ or $Al_2O_3$, and the nanostructures 313 are formed from amorphous $TiO_2$ or cubic ZnO. In any of those specific non-limiting embodiments, the nanostructures 313 may be in the form of include an array of cylindrical pillars, e.g., with a largest linear dimension (e.g., height) in the range of about 100 to about 2000 nm. The lateral dimensions (in the plane of the substrate) in some embodiments are constrained by the wavelength of light, and are often less than or equal to one half (½) of the wavelength of light.

From FIG. 3B it can be appreciated that the path length of rays emitted from the point light source 315 in a spherical wave front 317 increases as one moves radially outward from the optical axis 350 (assuming the point light source 315 is at the focus of the metalens 301). Similarly, the angle of incidence at which light in the incident spherical wave front 317 impinges on metalens 301 generally increases as one moves radially outward from the optical axis 350. It may therefore be desired to control the degree to which the array of nanostructures 313 in the metasurface 305 alters the phase of incident light, based at least in part on the position on which the light is incident relative to the optical axis 350 of the metalens 301. Put in other terms, it may be desirable to configure the array of nanostructures 313 such that the phase delay imparted by such structures to a light in an incident hemispherical wave front 315 is dependent on the radial position of those nanostructures relative to the optical axis 350 of the lens.

In some embodiments therefore the array of nanostructures 313 in the metasurface 305 is configured to compensate for the difference in optical path length and/or angle of incidence as one moves radially outward from the optical axis 350. This may be accomplished, for example, by varying aspects of the geometry (e.g., height, width, radius, etc.) of the nanostructures 313, either independently, in the context of a unit cell containing a plurality of nanostructures 313, or even in the context of an array containing a plurality of unit cells.

For example, during the design process the metasurface 305 may be subdivided into a plurality of two dimensional (2D) unit cells, wherein each unit cell includes a plurality of nanostructures 313. The unit cells may have any suitable geometry, and may be symmetrical or asymmetrical. Without limitation, in some embodiments all or at least a portion of the shape of the unit cells and their contents are symmetrical (e.g. square, hexagonal, triangular, etc.), so as to reduce or eliminate polarization dependent effects. A plurality of such unit cells may be used to make up one or more regions of the metasurface 305. In such instances the geometry of each unit cell (e.g., length, width, etc.) and/or the nanostructures 313 therein (e.g., nanostructure height, width, diameter, position within a unit cell, etc.) may be controlled such that the nanostructures 313 in each respective unit cell imparts an appropriate phase change to incident light, based at least in part on the position of the unit cell relative to the optical axis 350 of metalens 301.

Through appropriate design of the metasurface 305 (or, more particularly, nanostructures 313 and/or unit cells containing such nanostructures), it is possible to design metalenses that exhibit useful optical properties for visible light applications such as LARP and LED collimation. Such properties include but are not limited to high numerical aperture (NA), short focal length, polarization insensitivity, and/or high lens transmission (e.g., in the visible region).

As used herein, the term "high numerical aperture" means a numerical aperture that is greater than or equal to about 0.5. Therefore in some embodiments the metalenses described herein may exhibit a NA that is greater than or equal to about 0.5, such as greater than or equal to about 0.6, greater than or equal to about 0.7, greater than or equal to about 0.8, greater than or equal to about 0.9, or even greater than or equal to about 0.95.

As used herein, the term "short focal length" means a focal length that is less than or equal to about 5 millimeters (mm). Therefore in some embodiments, the metalenses described herein have a focal length that is less than or equal to about 5 mm, less than or equal to about 4 mm, less than or equal to about 3 mm, less than or equal to about 2 mm, less than or equal to about 1 mm, less than or equal to about 0.5 mm, or even less than or equal to about 0.2 mm. Without limitation, in some embodiments the metalenses described herein have a focal length of less than or equal to about 1 mm.

As used herein, the term "lens transmission" means the percentage of light that is within the lens numerical aperture that is transmitted through the lens into a collimated beam down field of the lens. In some embodiments the metalens described herein have a lens transmission for light in the visible range that is greater than or equal to about 50%, such as greater than or equal to about 60%, about 70%, about 80%, about 90%, or even about 99%. Without limitation, in some embodiments the metalenses described herein have a metalens transmission of greater than or equal to about 80% for light in the visible range.

In some embodiments the metalenses described herein exhibit a combination of high numerical aperture, short focal length, and high lens transmission for light in the visible range. For example, in some embodiments the metalenses described herein have a numerical aperture that is greater than or equal to 0.5, a focal length of less than or equal to about 2 min, and have a lens transmission greater than or equal to 50% for visible light. In further non-limiting embodiments, metalenses consistent with the present disclosure have a numerical aperture that is greater than or equal to 0.8, a focal length of less than or equal to about 1 mm, and have a lens transmission of greater than or equal to 80% for visible light.

The overall geometry of the metalenses described herein may vary widely. For example, the metalenses described herein may be in the form of a substantially flat, one-dimensional (1D) lens (analogous to a traditional refractive cylindrical lens), a two-dimensional (2D) lens (analogous to a traditional refractive spherical and aspherical lens), or, by application of the metalens structures on both sides of the substrates, in the form of a functional equivalent of a traditional refractive bi-convex, bi-concave, or convex-concave lens. A hybrid refractive metalens may also be formed by the use of a substrate having one or more curved surfaces.

Without limitation, in some embodiments metalens 301 is in the form of a substantially flat, two-dimensional (2D) lens. As used herein, the term "substantially flat" when used in the context of a 2D lens means that the average surface roughness (Ra) of the lens is less than about 10 nm, such as less than about 5 nm, or even less than about 2 nm. Put differently, in some embodiments the overall surface roughness of the metalens is less than wavelength/10, so as to limit or prevent the introduction of phase errors.

The overall dimensions of the metalenses described herein may vary widely, and metalenses of any suitable size may be used. In instances where the metalenses is a 2D circular lens, for example, such lenses may have a diameter ranging from about 0.2 mm to about 3 centimeters (cm) or more, such as from about 1 mm to about 5 mm.

In some embodiments the metalenses described herein function to focus light incident on one side thereof and (by reciprocity) to collimate light incident on another side thereof. For example and with reference to FIG. 3A, the metalens 301 may (through appropriate configuration of metasurface 305), be configured to focus light that is incident on a first side thereof and to collimate light that is incident on a second side thereof. In some embodiments the first side is the side of metalens to which the first side 309 of substrate 303 is oriented, whereas the second side is the side of metalens 301 to which the second side 311 of substrate is oriented. Of course metasurface 305 need not be configured in that manner. For example, in some embodiments metasurface 305 may be configured to collimate light that is incident on the first side 309 of metalens 301, and to focus light that is incident on the second side of metalens 301, wherein the first and second sides of metalens are defined as previously described.

As noted above, the inventors have discovered that through appropriate configuration of a metasurface, it is possible to produce metalenses that exhibit a combination of properties that render them attractive for use in a variety of lighting applications, such as LARP, LED collimation, laser based spectroscopy, and the like. For example the metalenses described herein can exhibit a combination of short focal length and high numerical aperture. It is therefore possible to use such lenses as a collimating optic in a LARP system, wherein the metalens is placed at a distance (d) from the wavelength converter, where d is the same as or different from the focal length (f) of the metalens. This can allow a dichroic mirror to be placed quite close to the metalens, resulting in a highly compact reflective LARP system in which the metalens can produce a highly collimated beams from an incident hemispherical/spherical wave front while maintaining étendue. Similar advantages can be obtained in other LARP configurations, such as transmissive LARP (e.g., where primary light is incident on one side of wavelength converter, secondary light is emitted on the other side of the wavelength converter, and a collimating metalens collimates the secondary light) and reflective LARP using off-axis illumination. Moreover, similar advantages can be attained using the metalenses described herein as a collimating optic for LED collimation, collimation of near-point sources (output from a single mode or small diameter multi-mode fiber) optic and other systems.

Figure 4:
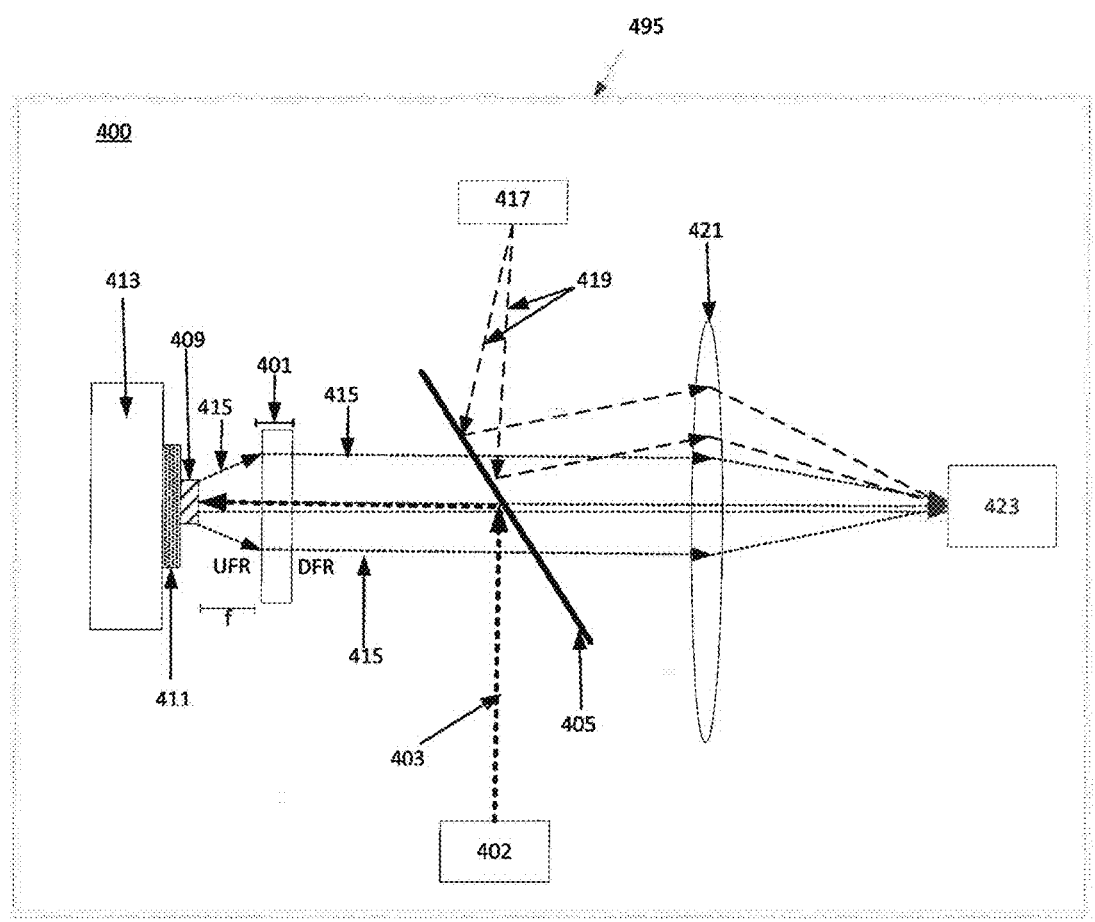
FIG. 4 depicts one example of a LARD system including a collimating metalens consistent with the present disclosure.

Another aspect of the present disclosure is a laser assisted remote phosphor (LARP) system that includes a metalens consistent with the present disclosure as a collimating optic (also referred to herein as a collimating metalens). Reference is therefore made to FIG. 4, which depicts one example of a LARP system 400 consistent with the present disclosure. As shown, LARP system 400 includes a collimating metalens 401, a first light source 402, a dichroic beam splitter 405, and a LARP target that includes a wavelength converter 409, a substrate 411, and a heat sink 413. Although one or ordinary skill will understand that other components can also be included in LARP system 400 (e.g., mirrors, driving circuits, heat sinks, etc.), such components have been omitted in the interest of brevity and ease of understanding.

In operation the first light source 402 emits primary light rays 403 towards the dichroic beam splitter 405. The dichroic beam splitter 405 reflects the rays 403 towards the collimating metalens 301. In this application the collimating metalens 401 includes a metasurface and a substrate that are configured to transmit the primary light rays 403 such that they are incident on the wavelength converter 409. The metalens 401 in this application is designed to provide different focusing properties of the primary light rays 403 than would occur with the secondary light rays 415. This provides a degree of flexibility that cannot be obtained with traditional refractive optics or diffractive optics. In some respects, the metalens 401 can act as a wavelength dependent optic or kind of notch filter for all or a portion of the primary light rays 403, while focusing or collimating the secondary light rays 415 and having little influence on unconverted primary light that may be redirected back through the metalens 401. Otherwise collimating metalens 401 is configured and operates in much the same manner as described herein with regard to the metalens 301 of FIG. 3 and/or the multiregion metalenses described later. Without limitation, in some embodiments the metalens 401 is a multiregion metalens.

After passing through the metalens 401 the primary light rays 403 are incident on wavelength converter 409. Generally, the wavelength converter functions to convert the primary light rays 403 to secondary light rays 415, e.g., via photoluminescence. The secondary light rays 415 emitted by the wavelength converter 409 are of a wavelength or wavelength range that differs from the (first) wavelength of primary light rays 403.

The wavelength converter 409 emits the secondary light rays 415 in a first light distribution (e.g., a hemispherical (Lambertian) distribution), such that a first (e.g., spherical, hemispherical, etc.) wave front of secondary light rays 415 is incident on the metalens 401. As shown, the distance between the metalens 401 and a surface of the wavelength converter 409 may correspond to the focal length (f) of the metalens 401, but it should be understood that this is not required. Consistent with the prior discussion, f may be less than or equal to about 5 mm, 4 mm, 3 mm, 2 mm, less than or equal to about 1 mm, less than or equal to about 0.5 mm, or even less than or equal to about 0.2 mm. Without limitation, in some embodiments f is less than or equal to about 1 mm.

As discussed herein the metalens 401 includes a metasurface that is configured to convert the first (e.g., spherical, hemispherical, etc.) wave front of secondary light rays 415 into a second (e.g., planar) wave front, such that the secondary light rays 415 are collimated in a region down field (DFR) of metalens 401, relative to wavelength converter 409. The metalens 401 may also be configured to exhibit a combination of high numerical aperture (NA), short focal length (f), and high lens transmission for the secondary light rays 415. For example, the metalens 401 in some embodiments has an NA greater than or equal to 0.5 (e.g., ≥0.8), a focal length f of less than or equal to 2 min (e.g., f≤1 mm), and has a lens transmission greater than or equal to 50% for the wavelength(s) of the secondary light rays 415. Alternatively in some embodiments the metalens 401 in some embodiments has an NA greater than or equal to 0.9, a focal length f of less than or equal to 2 mm (e.g., f≤1 mm), and has a lens transmission of greater than or equal to about 80% for the wavelength(s) of the secondary light rays 415. Of course, metalens 401 can exhibit other (e.g., higher) numerical aperture, as well as different lens transmission.

The collimated secondary light rays 415 pass through the dichroic beam splitter 405 and are focused by lens 421 onto other optics 423 (e.g., fiber optics, projection optics, etc.) of the LARP system 400. If desired, an optional second light source 417 may be used to add additional color channels 419 that reflect off of the dichroic beam splitter 405 to be focused on the additional optics 423 by the lens 421, as shown.

The first light source 402 may be a laser light source that is configured to emit primary light rays 403 of any suitable wavelength, provided that they can be reflected off of dichroic beam splitter 405 and transmitted through the metalens 401, as generally shown in FIG. 4. For example, in some embodiments the light source 402 is a laser that emits primary light rays 403 in the violet, blue, green, yellow, red, or other portion of the visible region of the electromagnetic spectrum. Without limitation, in some embodiments first light source 402 is a blue laser that emits primary light rays 403 having a wavelength ranging from about 430 to about 470 nm. Alternatively, the light source 402 may be a diode laser or other light source that emits primary light rays 403 in the near ultra-violet and/or ultra-violet regions, ranging from 375 nm-420 nm. Alternatively, the light source 402 may emit visible light in range of about 470 to about 670 nm. As will be appreciated, the wavelength of primary light rays 403 and the composition of wavelength converter 409 may vary considerably, and may be chosen in combination based on the desired application.

As noted previously in the embodiment of FIG. 4 the metalens 401 is configured with a notch filter characteristic, such that it transmits light of the wavelength(s) of the primary light rays 403. Therefore when the primary light rays 403 are blue laser light with a wavelength in the range of 430 to about 470 nm (e.g., 440 nm, 460 nm, etc.), the metalens 401 is configured with a notch filter characteristic for light in the range of about 430 to about 470 nm (e.g., 440 nm, 460 nm, etc.).

The wavelength converter 409 generally functions to convert incident primary light rays 403 to secondary light rays 415. In that regard, in some embodiments the wavelength converter 409 is formed from or includes one or more photo luminescent materials that are capable of converting incident primary light rays 403 to secondary light rays 415. Non-limiting examples of suitable photo luminescent materials that may be used include cerium activated garnets of the general formula $(Y, Lu, Gd)_3Al_5O_{12}$:Ce (e.g., $Y_3Al_5O_{12}$:Ce (Ce:YAG), $Lu_3Al_5O_{12}$:Ce (Ce:LuAG), and $(Y, Gd)_3Al_5O_{12}$:Ce (CE:GdYAG), europium activated oxynitrides of the general formula $(Ba, Ca, Sr)Si_2O_2N_2$:Eu (e.g., $(SrSi_2O_2N_2$:Eu (Eu:SrSiON), and various other phosphor materials known in the art. Without limitation, in some embodiments wavelength converter 409 is or includes one or more of Ce:YAG, Ce:LuAG, Ce:GdYAG, or Eu:SrSiON. In some embodiments the wavelength converter 409 is a ceramic phosphor plate, meaning that it is a solid, sintered polycrystalline photo luminescent material, e.g. of one or more of the materials identified above as being suitable for use in the wavelength converter 409.

As shown in FIG. 4 the wavelength converter 409 is coupled to a substrate 411, which in turn is coupled to a heat sink 413. Without limitation, the wavelength converter 409 in some embodiments is a ceramic phosphor platelet that is bonded to a high reflectivity substrate 411 with an optional high thermal conductivity adhesive (not shown). When used, the high thermal conductivity adhesive may be formed any suitable high thermal conductivity material, such as alumina, zinc oxide filled silicone, low temperature glasses, and the like. Alternatively or additionally, the wavelength converter 409 may be a ceramic phosphor that is coated with a highly reflective coating, and which is soldered to the heat sink 413. The heat sink 413 generally functions to remove excess heat that may be produced by wavelength converter 409 during the conversion of primary light rays 403 to secondary light rays 415.

As discussed above the metalens 401 can exhibit desirable optical properties for LARP, but may be relatively small compared to specialized collimating optics previously used for LARP applications. For example, the metalens 401 may be a circular 2D lens having a diameter ranging from about 0.2 mm to about 3 centimeters (cm), such as from about 1 min to about 1 cm, or even about 1 mm to about 5 mm. The other components of LARP system 400 may be correspondingly reduced in size, resulting in a compact LARP system that can be used in various compact light applications.

Another aspect of the present disclosure relates to lighting devices that include a LARP system that includes a collimating metalens. This concept is shown in FIG. 4, which depicts the LARP system 400 as being optionally included in a lighting device 495. Non-limiting examples of lighting devices that may be used as lighting device 495 include automotive lighting fixtures (e.g., headlamps, turn signals, fog lamps, etc.), interior and exterior lighting fixtures (e.g., overhead lighting fixtures, luminaires, spotlights (e.g., PAR spotlights), security lighting, etc.), industrial lighting, flashes for smart phone and other cameras, fiber optic sources (microscopes), collimating light from an optical fiber, combinations thereof, and the like. Without limitation, in some embodiments lighting device 495 is a compact light device, such as but not limited to an automotive headlamp, automotive tail lamp, automotive turn signal, automotive interior light, automotive spot light, automotive fog light, or the like. In some embodiments, lighting device 495 is an automotive headlamp.

Another aspect of the present disclosure relates to a collimation system in which a metalens consistent with the present disclosure is used as a collimating optic. More specifically, one aspect of the present disclosure relates to an LED collimation system in which a collimating metalens is used to collimate light from one or more LEDs, such as a chip level or remote phosphor conversion LED. In that regard reference is made to FIG. 5, which depicts one non-limiting example of the structure of a collimation system consistent with the present disclosure. As shown, collimation system 500 includes a collimating metalens 501 and a light source 502. Although one or ordinary skill will understand that other components can be included in the collimation system 500 (e.g., mirrors, driving circuits, heat sinks, etc.), such components have been omitted from FIG. 5 in the interest of brevity and ease of understanding.

Similar to the wavelength converter 409, the light source 502 is generally configured to emit light rays 503 of a given wavelength or wavelength range into a region up field (UFR) of the metalens 501. Unlike the wavelength converter 409, however, emission of the light rays 503 by the light source 502 from a light emitting surface thereof, e.g., in response to the application of a driving electric current.

The light source 502 is aligned along the optical axis 507 of the metalens 501 and may emit light rays 503 in any region of the electromagnetic spectrum, such as the ultraviolet, visible, and/or infrared regions. Without limitation, in some embodiments the light source 502 is configured to emit light rays 503 in the visible region of the electromagnetic spectrum.

Regardless of the wavelength of the light rays 503, the light source 502 is configured to emit a distribution of such rays into a region up field (UFR) of the metalens 501. The light rays 503 have a first distribution and a first wave front in the UFR. The light rays 503 are then incident on a metasurface (not shown) of metalens 501 or, more particularly, on an array of nanostructures in that metasurface.

Like the metasurfaces of the previously described metalenses, the metasurface of the metalens 501 is configured to impart a phase change to the light rays 503, such that the light rays 503 are collimated in a region down field of the metalens 501 (DFR) and have a second wave front that differs from the first wave front of the light rays 503 in the UFR. For example, in instances where the light rays 503 have a spherical or hemispherical wave front in the UFR, the metasurface may be configured to impart a phase change to the light rays 503 such that they are collimated and have a have a planar wave front in the DFR. In that way, the metalens 501 can produce a collimated light beam of parallel light rays 503 in the DFR.

The metalens 501 in FIG. 5 (i.e., for extended source collimation applications) generally functions in much the same manner as the other metalenses described herein, such as metalenses 301 and 401 in FIG. 3 and FIG. 4 (e.g., for LARP applications), and the multiregion metalenses described later. A detailed discussion of the structure and function of the metalens 501 is therefore not reiterated for the sake of brevity. One notable exception is that unlike metalenses for LARP applications (e.g., metalens 401), the metalens 501 does not need to be configured to transmit pump (primary) light that is emitted from a first light source (e.g., a laser), such that the primary light is incident on a wavelength converter. Therefore for extended source collimation systems such as the one shown in FIG. 5, it is not necessary to configure at least a portion of the metasurface of the metalens 501 with notch bandpass characteristics, e.g., for the transmission of incident primary light.

Similar to the discussion of LARP system 400, the components of the collimation system 500 may be made quite small due to the relatively small size of the metalens 501 as compared to conventional collimating optics. The collimation system 500 can therefore be utilized in a wide variety of lighting devices. In that regard another aspect of the present disclosure relates to lighting devices that include a point source collimation system consistent with the present disclosure. This concept is shown in FIG. 5, which depicts point source collimation system 500 as optionally being included in a lighting device 595. Non-limiting examples of lighting devices that may be used as lighting device 595 include the lighting devices enumerated above as being suitable for lighting device 495. Without limitation, in some embodiments lighting device 595 is a compact lighting device, such as but not limited to an automotive lamp, automotive tail lamp, automotive turn signal, automotive interior light, automotive spot light, automotive fog light, a PAR spotlight, or the like. Without limitation, in some embodiments the lighting device 595 is an automotive headlamp.

The present disclosure will now proceed to describe various examples of metalenses that can exhibit properties that are useful for lighting applications such as LARP, LED collimation, and the like. Before discussing those examples, however, it is helpful to understand various design considerations that can be leveraged to guide the design of metalenses consistent with the present disclosure.

As discussed briefly above, conventional diffractive optics (e.g., spherical lenses, ball lenses, gradient index (GRIN) lenses, etc.) can be used to collimate light from a point source such as an LED, a wavelength converter, or the like. In such instances, rays emanating from point light source, situated at the focus of the lens, are refracted by the optic. To form parallel rays at its output (i.e., in a region down field of the lens), the degree to which the lens bends light generally increases as one moves away from the optical axis of the lens. More specifically in the case of perfect collimation from a point source (no spherical aberration), the collimating optic is designed such that it provides a negative optical path length delay of $\Delta l$, where $\Delta l = \sqrt{(f^2+x^2+y^2)} - f$, in which f is the focal length of the lens (in meters), and x and y are horizontal and vertical axis coordinates on the lens (in meters). Or more specifically, the optic is configured to produce a radially dependent phase delay $\Delta \phi$) given by equation (I) below:

$$\Delta\phi = \frac{2\pi}{\lambda} n_m \left( f - \sqrt{f^2 + x^2 + y^2} \right) + \phi_0 \qquad (I)$$

in which $\lambda$ is the wavelength of light passing through the lens, $n_m$ is refractive index of the medium in which the incident light is propagating, f is the focal length of the lens in meters, x and y are horizontal and vertical coordinates on the lens in meters, and $\phi_0$ is a constant phase factor which may represent a baseline phase shift through the lens. The radial distance (r) from the optical axis of the lens is given by $r = \sqrt{x^2 + y^2}$. Moreover it is emphasized that $\Delta\phi$ is negative, and decreases (i.e., becomes more negative) as the radial distance r from the optical axis increases.

Figure 6:
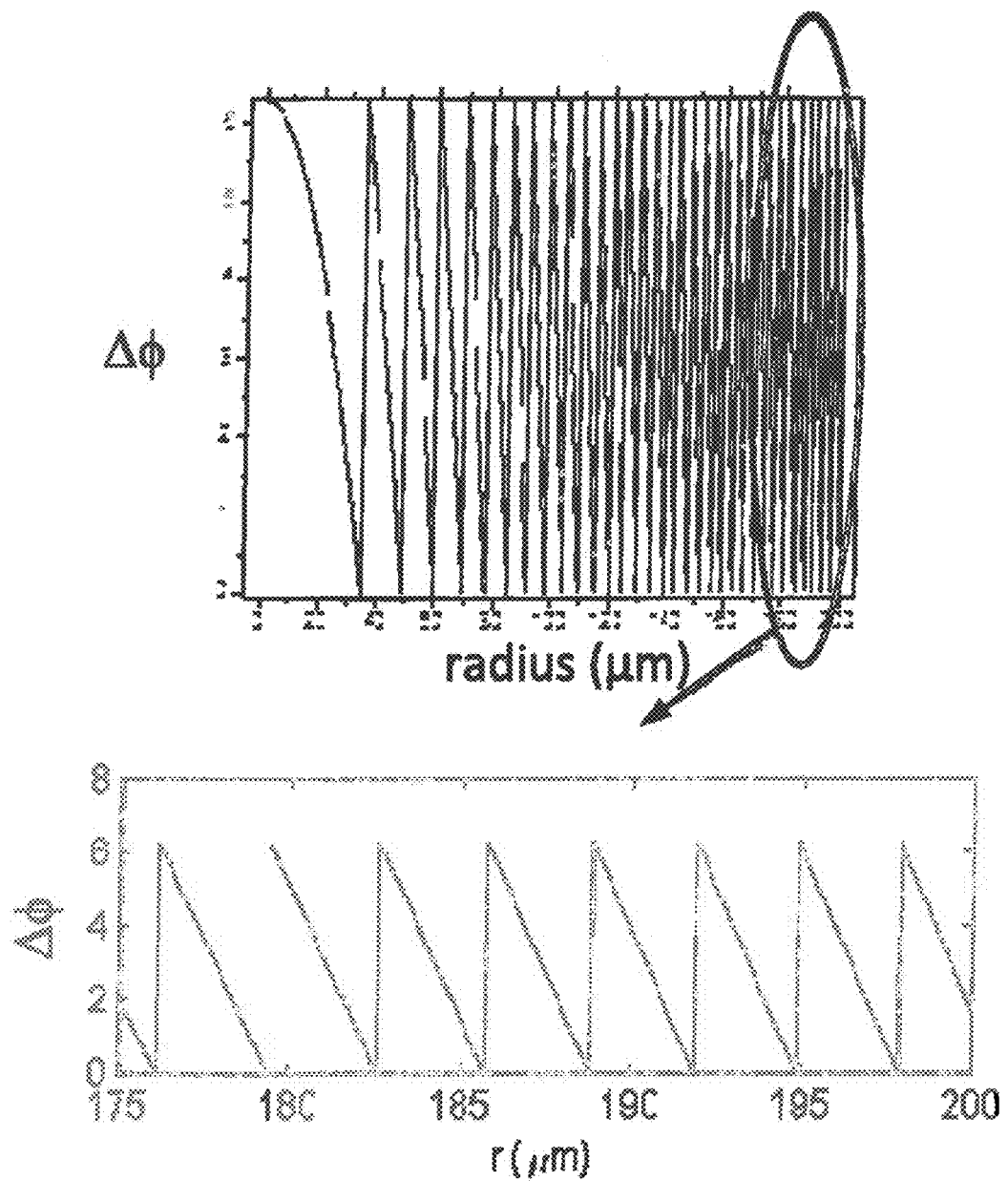
FIG. 6 is a plot of phase delay (Δϕ) of a metasurface, versus the radial distance (r) from the optical axis of one example of a target hyperboloidal phase shift for a metalens consistent with the present disclosure.

In the context of designing metalenses consistent with the present disclosure, the inventors have recognized that phase of the wave front at the output side of the lens (e.g., in a region down field of the lens, relative to a light source) only needs to be determined to a multiple of $2\pi$ and, thus, the optical phase transformation of the nanostructures in the metasurface of a metalens only needs to be defined modulo $2\pi$. This concept is generally illustrated in FIG. 6, which is a plot of phase delay ($\Delta\phi$) of a metasurface, versus the radial distance (r) from the optical axis of the metalens. It is noted that that FIG. 6 is provided to illustrate the general concept of radially dependent phase delay using one example of a metalens. It should therefore be understood the values of $\Delta\phi$ and r specified therein are for the sake of example only and the metalenses described herein are not limited thereto.

Thus, unlike conventional refractive optics, the nanostructures used in the metasurface of the metalenses described herein do not need to provide the full negative path length delay, $\otimes \phi$, at each radial position of the lens. Rather, the nanostructures only need to provide phase shifts ($\Delta\phi$) up to $2\pi$ or a multiple of $2\pi$, wherein the phase shift provided at any point on the metasurface may vary as a function of the radial distance (r) from the optical axis of the metalens. This is described in equation (II) below:

$$\Delta\phi = \frac{\text{mod}}{2l\pi} \left[ \frac{2\pi}{\lambda} n_m \left( f - \sqrt{f^2 + x^2 + y^2} \right) + \phi_0 \right] \qquad (II)$$

in which l is number of $2\pi$ phase shifts that occur before a (0–$2\pi$) phase jump. In many instances the metalenses described herein are designed with l=1, so as to limit the amount of phase shift the nanostructures in the metasurface must produce. It should be understood that the metalenses described herein are not limited to those designed with l=1, and that in some embodiments 1 may be greater than or equal to 2.

This concept is generally shown in FIG. 6, which is a plot of a target hyperboloidal phase shift ($\Delta\phi$ as calculated by equation (II) for the case of l=1) of a metalens as a function of radius (first 200 µm) the optical axis of a metalens, wherein the focal length (f) is 1.0 min and $\phi_0$ is $2\pi$. The phase shift may be divided into a plurality of phase jump regions (or zones), wherein each phase jump region is defined by a phase shift of $2\pi$–0. For example in FIG. 6, the first phase jump zone extends from r=0–32 µm and corresponds to a phase shift of $2\pi$–0, and so forth. To avoid ambiguities, especially with regions containing $2l\pi$ phase jumps, the term "phase jump regions" (also referred to as "phase jumps" or "phase jump zones") is used to designate regions separated by $2l\pi$ increments in the phase change.

As can be seen from the blown up region of FIG. 6, the target hyperboloidal phase shift becomes increasingly linear between phase jumps as one moves radially outward from the center of the lens. As r increases beyond a threshold radius (e.g., corresponding to roughly 5-10 phase jumps), the target hyperboloidal phase shift may be closely approximated by a locally periodic sawtooth phase. The inventors have leveraged this fact to design metalenses that include nanostructures that closely approximate the target hyperboloidal phase in the region outside the threshold radius with structures that produce locally periodic sawtooth phase changes. In general, one can choose the threshold radius (i.e., radial position) at which that transition occurs. From FIG. 6 it is also apparent that the phase jumps become increasingly close to one another as one moves radially outward from the axis of the lens.

With the foregoing in mind, another aspect of the present disclosure relates to collimating metalenses. Such metalenses include a metasurface that is formed on (e.g., directly on) a surface of a substrate, wherein the metasurface includes one or more regions. In the latter instance, the metasurface in some embodiments may include a first region and a second region, where the first region is proximate to the center and/or the optical axis of the metalens, whereas the second region is radially outward of the first region and extends annularly around the first region. In some embodiments, the second region is configured to take advantage of the fact that the target hyperboloidal phase outside of the threshold radius can be approximated by nanostructures that produce a local sawtooth phase shift. For example, the second region in some embodiments includes nanostructures that are aligned with the $2\pi$ phase jumps rather than fixed to a specific periodic array format. The nanostructures can also be arranged to approximate a radially varying local sawtooth phase variation that is functionally equivalent to a local blazed diffraction grating, whose period varies smoothly with radius.

In contrast, in some embodiments the first region that is proximate to the center and/or optical axis of the metalens is not designed to produce a local sawtooth phase shift. Rather, in such embodiments the nanostructures in the first region are configured to produce a phase shift that is consistent with (e.g., fully accounts for) the target hyperboloidal phase shift versus radius as exemplified by FIG. 6 and described above. More particularly, in some embodiments the nanostructures of the first region are designed such that the curvature or nonlinearity that is present within the first few phase jumps of the target hyperboloidal phase shift is well reproduced by the first region for accurate collimation. In other embodiments, the first region may be composed of nanostructures that are still commensurate with the radial phase jumps, but which are configured to produce a phase shift that closely approximates the full target hyperboloidal phase shift.

In either case (single or multiregion metalenses), the metasurface of the metalens is configured such that the nanostructures proximate the optical axis or the center of the lens provide a phase shift that is a first type of approximation of a target hyperboloidal phase, whereas the nanostructures that are radially outward from the center or optical axis of the lens (i.e., past a threshold radial position) provide a phase shift that is a second type of approximation of the target hyperboloidal phase. In some embodiments, for example the nanostructures in the region proximate the center or optical axis of the lens may be configured to provide a phase shift that approximates the full hyperboloidal target phase. In contrast, the nanostructures in the region radially outward from a threshold radius may be configured to provide a phase shift that approximates the hyberboloidal target phase in another manner, such as with a locally periodic sawtooth phase.

Figure 7:
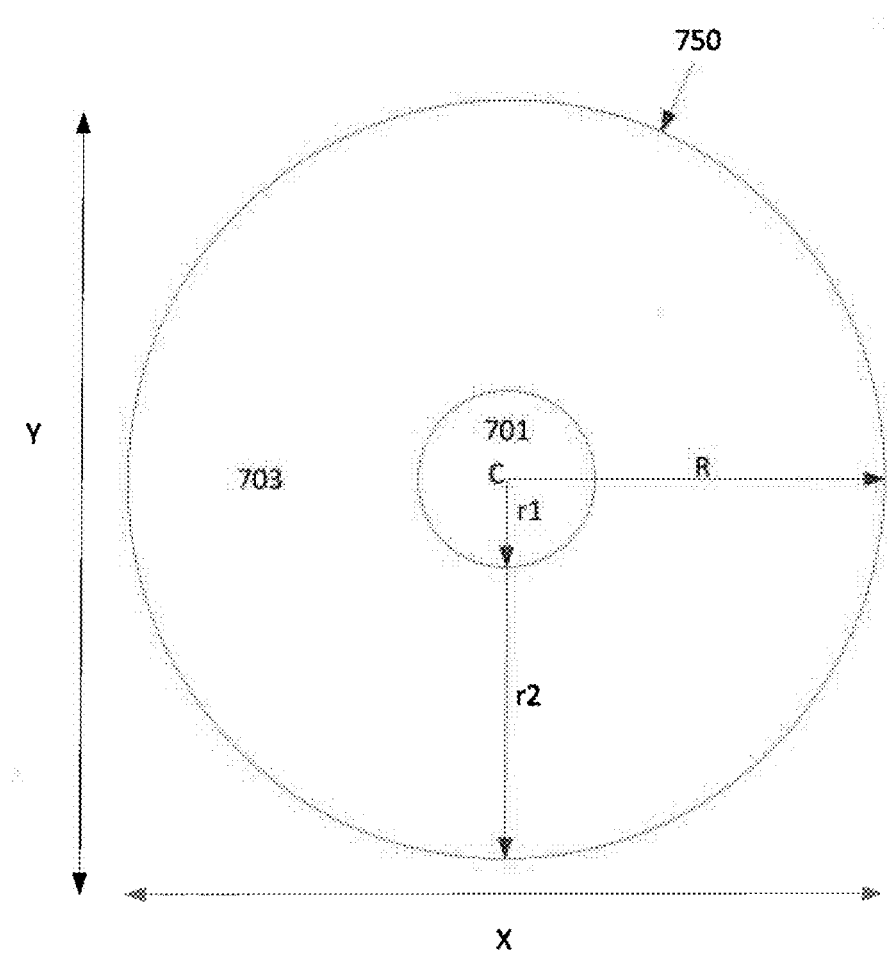
FIG. 7 is a top down view of the structure of one example of a multiregion metalens consistent with the present disclosure.

FIG. 7 provides a top down view of the structure of one example of a multiregion metalens 700 consistent with the present disclosure. As shown, the multiregion metalens 700 includes a metasurface 750, which is formed on one side of an (ideally flat) substrate. It is noted that for the sake of example, the multiregion metalens 700 is depicted as having a circular metasurface 750 with a radius of R. It should be understood, however that the multiregion metalenses described herein are not limited to that geometry, and that the metasurface 750 may have any suitable geometric shape.

The metasurface 750 includes a first region 701 with a radius $r_1$ that is disposed around a center (C) of the metasurfaces 750. As noted previously, the first region 701 includes a first nanostructure array that is configured to impart a phase shift to light incident thereon that closely approximates the full target hyperboloidal phase as specified by equation II.

Figure 11:
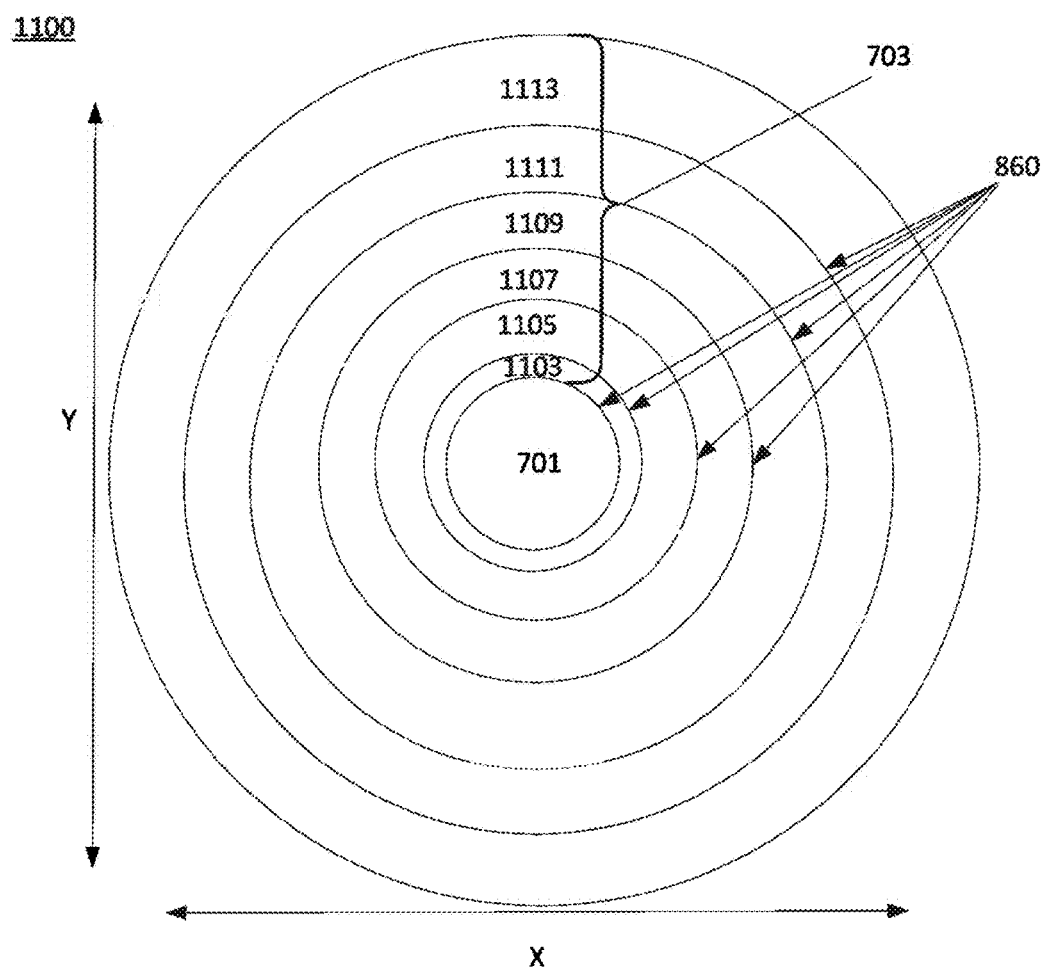
FIG. 11 is a top down view of one example of a multi-region metalens consistent with the present disclosure.

In some instances the metasurface 750 further includes a second region 703 with a radius $r_2$. For example when $r_2$ is greater than 0, the second region 703 is disposed radially outward of and annularly around the first region 701. For the sake of clarity and ease of understanding the second region 703 in FIG. 7 is depicted as a single region that extends annularly around the first region 701. While such a configuration may be used, it should be understood that the second region 703 in some embodiments may include a plurality of subregions, wherein the subregions collectively function as the second region 703. This concept is illustrated in FIG. 11, which depicts one example of a metalens 1100 that includes a metasurface defined by a first region 701 and a second region 703 that is subdivided into a plurality of annular subregions 1103, 1105, 1107, 1109, 1111, 1113, etc. In this illustrated embodiment, the radial width of each of the subregions increases as one moves radially outward from the center of the lens, however such a configuration is not required and subregions of any suitable radial width may be used. For example, in some embodiments the radial width of each subregion within the second region 703 may be the same, or may decrease as one moves radially outward from the center or optical axis of the lens.

When used, the second region 703 includes a second nanostructure array that is configured to take advantage of the fact that a local sawtooth phase shift can be used approximate the target hyperboloidal phase specified by equation (II) in the portions of the lens that are radially outward of the first few phase jumps (i.e., in the region radially outward of the first region 701). This is different than the first type of approximation of the phase shift imposed by the first array of nanostructures in the first region 701 of the metasurfaces 750, which are designed to provide a phase shift that fully approximates the target hyperboloidal phase. The second nanostructure array may therefore be configured to impart a phase shift to light incident thereon, wherein the phase shift is a local sawtooth phase shift with period given by the location of the phase jumps in equation II. As may be appreciated, the local sawtooth phase shifts imparted by the second nanostructure array approximates the target hyperboloidal phase specified by equation II in the regions outside the first few phase jumps of the lens, but may not reproduce the non-linearity present in the phase jump regions of that portion of the target hyperboloidal phase.

In the embodiment of FIG. 7 the metasurface 750 has a circular shape with a radius (R) and, thus, FIG. 7 may be understood to depict a 2D circular metalens. The radius R is not particularly limited and thus, the metalens 700 (and, in particular, metasurfaces 750) may be of any suitable size. Without limitation, in some embodiments R ranges from about 0.1 to about 10 millimeters (mm), such as about 0.1 to about 5 mm, about 0.25 to about 5 mm, or even about 0.1 to about 1 mm. Of course such dimensions are enumerated for the sake of example only, and metalens 700/metasurface 750 may have a radius (R) of any suitable size.

Depending on the application for which metalens 700 is to be used, it may be desirable to control the radius ($r_1$) of the first region 701 relative to the radius ($r_2$) of the second region 703, or to the radius R of metasurface 750, where $R=r_1+r_2$. In some embodiments, the radius $r_1$ of the first region 701 ranges from greater than 0 to about 25% of R, such as from greater than 0 to about 20% of R, greater than 0 to about 15% of R, greater than 0 to about 10% of R, greater than 0 to about 5% of R, greater than 0 to about 2.5%, or even greater than 0 to less than or equal to 1% of R, where $r_2=R-r_1$. Without limitation, in some embodiments, $r_1$ ranges from greater than 0 to about 1% of R, and $r_2=R-r_1$. Thus for example, where $R=2.5$ mm, $r_1$ may be greater than 0 to about 0.025 mm.

In some embodiments, the radius $r_1$ may also be defined based on the focal length of the metalens 700. For example, in some embodiments $r_1$ may be a fraction of the focal length (f) of the metalens 700. In some instances, $r_1$ may be equal or about equal to one third, one quarter, one fifth, or a smaller or larger fraction of the focal length (f) of the metalens 700. Without limitation in some embodiments $r_1$ is equal to about one quarter of the focal length of the metalens 700. Thus for example, where f is about 1 mm, $r_1$ may be about 0.25 mm in such embodiments.

Alternatively, it may be desirable to define $r_1$ based on a calculated or predetermined number of $2\pi$ phase shifts. For example, in some embodiments $r_1$ may correspond to the radius at which a threshold number of $2\pi$ phase shifts occur, such as from greater than 0 to about 15, such as from greater than or equal to 1 to about 10, or even from about 5 to about 10 $2\pi$ phase shifts.

In some embodiments the first and second nanostructure arrays in the first and second regions 701, 703, respectively, may include an array of nanostructures that form a subwavelength high contrast grating (SWHCG) structure. As used herein, the term "subwavelength high contrast grating" means a nanostructure array that includes nanostructures in the array have lateral dimensions (parallel to the substrate) that are less than a wavelength of light that is to be incident thereon.

Figure 8:
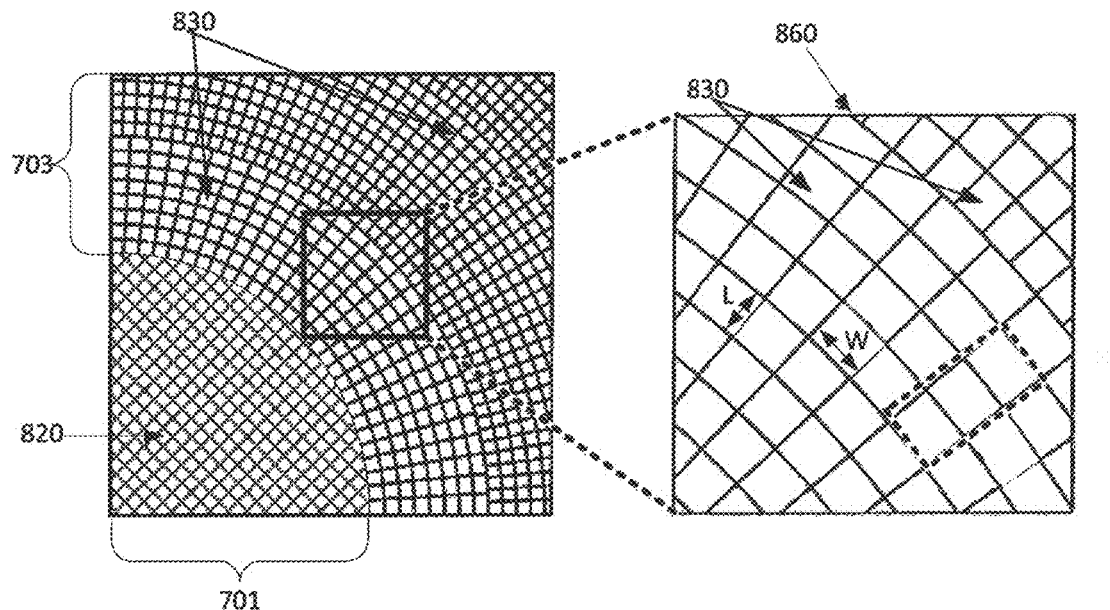
FIG. 8 is a top down view of a portion of another example of a metalens consistent with the present disclosure.

Nanostructures within the first nanostructure array may be grouped into first unit cells, wherein a lattice (e.g., a Bravais lattice) of first unit cells make up the entire first nanostructure array. This concept is illustrated in FIG. 8, which depicts a multiregion metalens 800 that includes a first region 701 including a plurality of first unit cells 820. As further shown, metalens 800 also includes a second region 703 that includes a plurality of second unit cells 830. As described herein, the geometry of the second unit cells 830 may be the same or different from the geometry of the first unit cells 820. In instances where the geometry of the first and second unit cells 820, 830 is the same, the discussion herein with regard to the first unit cells 820 should be considered to apply to the second unit cells 830.

The geometry of the first unit cells 820 may vary considerably provided the nanostructures therein have subwavelength lateral dimensions. The geometry of each of the first unit cells may be the same or different and a wide variety of different first unit cell geometries may be used. Non-limiting examples of suitable first unit cell geometries include triangular, quadrilateral (e.g., diamond, parallelogram, square, rectangular, etc.), hexagonal, and other non-periodic or quasi-periodic geometries. In any case, the first unit cells 820 may include a plurality (e.g., 2, 3, 4, etc.) of subwavelength nanostructures, such as but not limited to nanoscale pillars, spheres, etc.

Figure 9A:
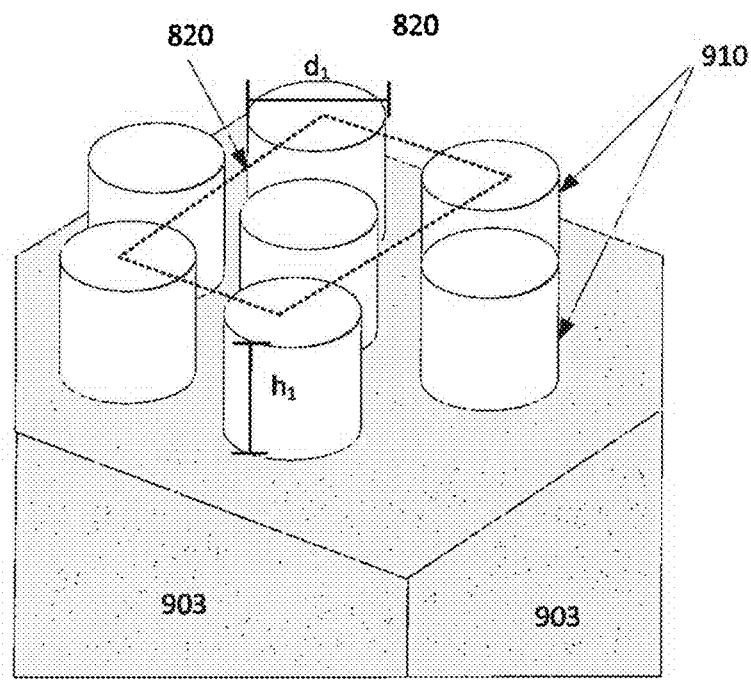
FIGS. 9A and 9B are perspective and top down views of one example of a unit cell consistent with the present disclosure.
Figure 9B:
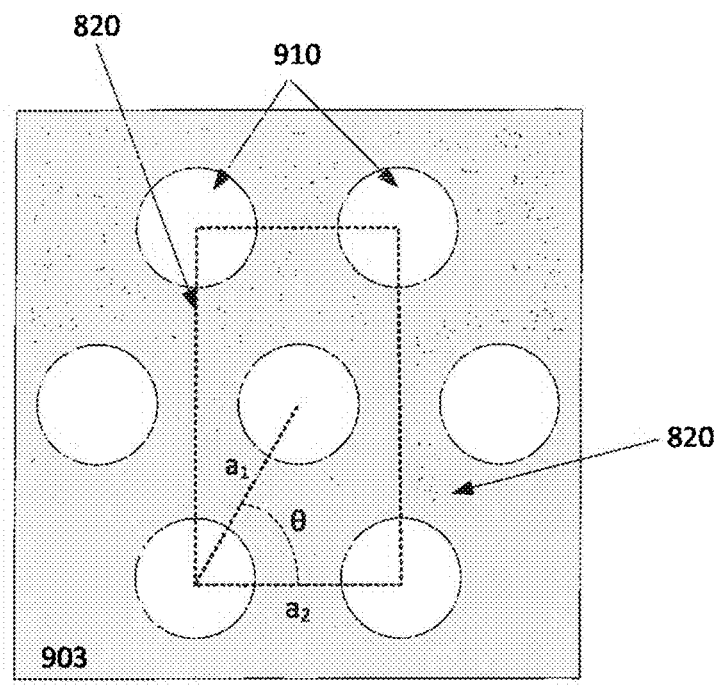

Without limitation, in some embodiments the metasurface of the first region 701 is in the form of a Bravais lattice of first unit cells 820. In such a lattice, each of the first unit cells 820 include one or a plurality (e.g., 1, 2, 3, 4, or more) of nanoscale pillars, such as cylindrical subwavelength nanopillars. The choice of the geometry of the unit cells may vary widely. In some embodiments the nanoscale pillars are arranged such that each unit cell has a rectangular geometry, with an internal angle θ between the lattice basis vectors. In some embodiments each unit cell contains 2 nanopillars, wherein an array of unit cells 820 define a hexagon and thereby form a hexagonal Bravais lattice. These concepts are illustrated in FIGS. 9A and 9B, which provide perspective and top down views, respectively of a magnified portion two adjacent first unit cells 820 of one example of a hexagonal Bravais lattice that may be used in a first region 701 of a multiregion metalens 700. In the case of the hexagonal Bravais lattice shown in FIG. 9A, θ=60°, and the length of the lattice basis vectors ($a_1$, $a_2$) are equal, e.g., $|a_1|=|a_2|$.

As shown in this example the hexagonal Bravais lattice includes a plurality of first unit cells 820, wherein each of the first unit cells 820 has a rectangular geometry and includes two nanostructures 910 (i.e., each unit cell 820 encompasses one Nano pillar and shares one quarter of four nanopillars with four adjacent first unit cells 820 (not shown)). Each pillar 910 has a height $h_1$, which may vary or be substantially constant between pillars within a first unit cell 820. In some embodiments $h_1$ ranges from about 50 to about 2000 nm, such as from about 500 nm to about 1000 nm, and is constant between pillars within the first and/or second regions. In some embodiments, $h_1$ is about 400 to about 600 nm. In further non-limiting embodiments, each nanostructure 910 has the same or about the same height $h_1$ in the first region 701. It should be understood that such ranges are not limiting, and that the actual height of the pillars may be determined, e.g., by various factors such as the desired phase shift, wavelength, refractive index, combinations thereof and the like.

As further shown, each nanostructure 910 also has a diameter $d_1$. In some embodiments $d_1$ ranges from about 50 to about 250 nm, such as about 100 to about 250 nm, or even about 200 to about 250 nm. In some embodiments, nanopillars 910 in the first region 701 each have the same or about the same height $h_1$, but their diameter $d_1$ may vary within the above ranges. In specific non-limiting embodiments, each of nanopillars 910 in the first region 701 have the same height $h_1$ (where $h_1$ ranges from about 100 to about 500 nm) and the diameter ($d_1$) of the nanostructures in the first region 701 varies within a range of about 100 to about 500 nm, such as within the range of about 100 to about 300 nm. Without limitation, in some embodiments $d_1$ varies within the first region 701 in a range of about 100 to about 290 nm, and may be set based on the radial position of a first unit cell 820 relative to the optical axis of the metalens.

As previously described the nanopillars 910 unit cells 820 may define a hexagon. This may be accomplished, for example, by defining the unit cell with lattice basis vectors ($a_1$, $a_2$), as shown in FIG. 9B, where the reciprocal lattice basis vectors ($b_1$, $b_2$) are defined by the relation $b_i \cdot a_j = 2\pi \delta_{ij}$, where i, j=1 or 2 and $\delta_{ij}$ is the Kronecker delta function which equals one when both indices are equal and zero when indices are different. To satisfy the condition for a subwavelength grating, the reciprocal lattice basis vectors should satisfy the equation (III) below:

$$|b_{i,j}| > \frac{2\pi}{\lambda_v} \qquad (III)$$

where i and j are 1 and 2, respectively, and $\lambda_v$ is the wavelength of light propagating in the medium with an refractive index ($n_m$) in which the source is immersed, or light propagating in the substrate 903 of the metalens, where the substrate has an refractive index ($n_s$). In instances where the source is in air, $n_m=1$. Typical values for the substrate include $n_s=1.46$ for fused silica, $n_s=1.52$ for borosilicate BK7 glass or $n_s=1.77$ for sapphire (alumina).

In some embodiments the first region 701 includes hexagonal lattice of cylindrical nanopillars such as the one shown in FIGS. 9A and 9B, wherein the lattice basis vectors ($a_1$, $a_2$) for a hexagonal lattice with a fundamental period $\Lambda$ are defined by equation (IV) below.

$$\Lambda = a_1 = a_2 < \frac{2}{\sqrt{3}} \cdot \frac{\lambda_0}{n_m} \qquad (IV)$$

where $\lambda_0$ is the wavelength of incident light propagating in air, $n_m$ is 1, and $\Lambda=|a_1|=|a_2|$. Thus for example, for a minimum wavelength of 500 nm for the nanostructures on a fused silica (n=1.46) substrate, Equation IV shows that the period $\Lambda$ (and, consequently, $a_1$ and $a_2$) is less than 395 nm. In general, $\Lambda$ (and $a_1$ and $a_2$) may range from about 100 to about 500 nm, such as from about 100 nm to about 350 nm, or even about 200 nm to about 350 nm. Of course such ranges are enumerated for the sake of example, and it should be understood that the actual values of $\Lambda$, $a_1$ and $a_2$ may differ therefrom, e.g., based on the substrate, the propagation medium (if the refractive index of the propagation medium is higher than that of the substrate and/or the shortest collimating wavelength.

Figure 10:
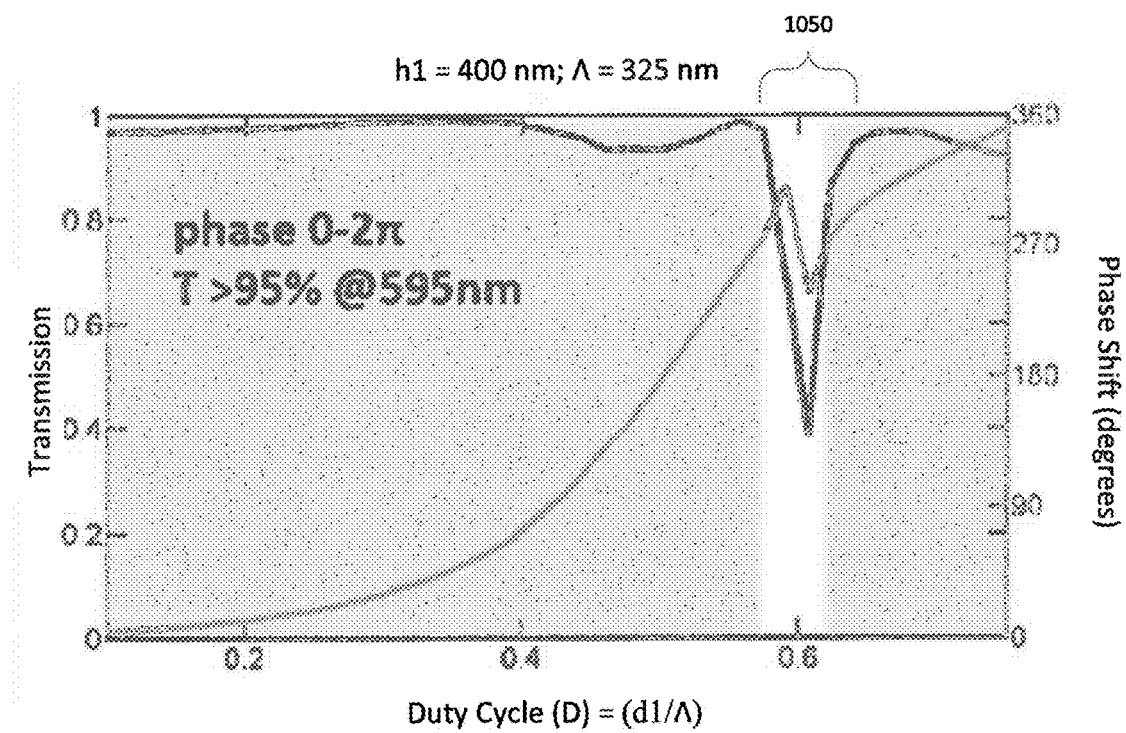
FIG. 10 is a plot of calculated phase shift and transmission imparted to an incident visible light plane wave by a hexagonal Bravais lattice of nanopillars consistent with embodiments of the present disclosure.

In some embodiments the first region 701 includes a Bravais lattice that includes an array formed from a large number of first unit cells 820 containing nanopillars 910 having a diameter d1, as shown in FIG. 9A. With that in mind, the inventors have used the fact that the duty cycle ($d_1/\Lambda$) of the first unit cells 820 can impact the phase shift that such unit cells impart to incident light. To illustrate this concept reference is made to FIG. 10, which depicts the calculated phase shift and transmission imparted to an incident plane wave having a wavelength of 595 nm by a hexagonal Bravais lattice of nanopillars 910 with a height $h_1$ of 400 nm, and a fundamental period A of 325 nm, versus the duty cycle (D) of the unit cells 910 in the lattice, where $D=(d_1/\Lambda)$. The condition for subwavelength operation for such a lens is $\lambda_0 \geq 411$ nm. For the sake of this calculation, the lattice was assumed to be formed on a fused silica substrate (n=1.46), with the light incident from the substrate side.

As shown, a hexagonal Bravais lattice of unit cells 910 can impart a full $2\pi$ (360°) phase shift for light in the yellow region (595 nm) without requiring a 100% variation in the duty cycle $(d1/\Lambda)$ of the first unit cells 820. More specifically, the results show that transmission through the structure is nearly 100% at all usable phase shifts. Although the calculations showed a destructive resonance 1050 at a duty cycle D=0.61, in practice that destructive resonance can be avoided because the full $2\pi$ phase shift range can be obtained by designing a metalens using duty cycles outside of the destructive resonance.

A high numerical aperture (NA) lens using a SWHCG such as the one described above in connection with the first region 701 can be attained using a hexagonal Bravais lattice that includes a large set of first unit cells 820 that have a fixed period. To achieve a spatially dependent phase shift specified by equation (II), however, the duty cycle of the unit cells 820 must vary according to the duty-cycle phase relationship of an array of such unit cells, as is demonstrated by FIG. 10.

By exercising appropriate control over the duty cycle, it is therefore possible to design a metalens that includes a metasurface that is solely formed from a hexagonal Bravais lattice of first unit cells 820. For example, it has been shown in the art that a metalens may be designed to include a single region that extends annularly around the optical axis of the lens, wherein the single region is includes a Bravais lattice of unit cells with the configuration shown in FIGS. 9A and 9B, and wherein the duty cycle of the unit cells 820 varies, e.g., as a function of their radial position relative to the optical axis of the lens.

Such a metalens design may be understood as corresponding to the design of FIG. 7, wherein $r_2=0$ and the first region 701 defines the entirety of metasurface 750 and includes an Bravais lattice of hexagonal unit cells with varying duty cycle. As noted, the duty cycle of the unit cells may be varied as a function of their radial position relative to the optical axis of the metalens. This may be accomplished, for example, by adjusting the diameter of the nanostructures in the unit cells, while holding their position and their height constant. More specifically, in instances where nanoscale cylindrical pillars are used, the center and height of such pillars may remain constant within the unit cells of the lattice, while the diameter of the pillars may vary.

Figure 12:
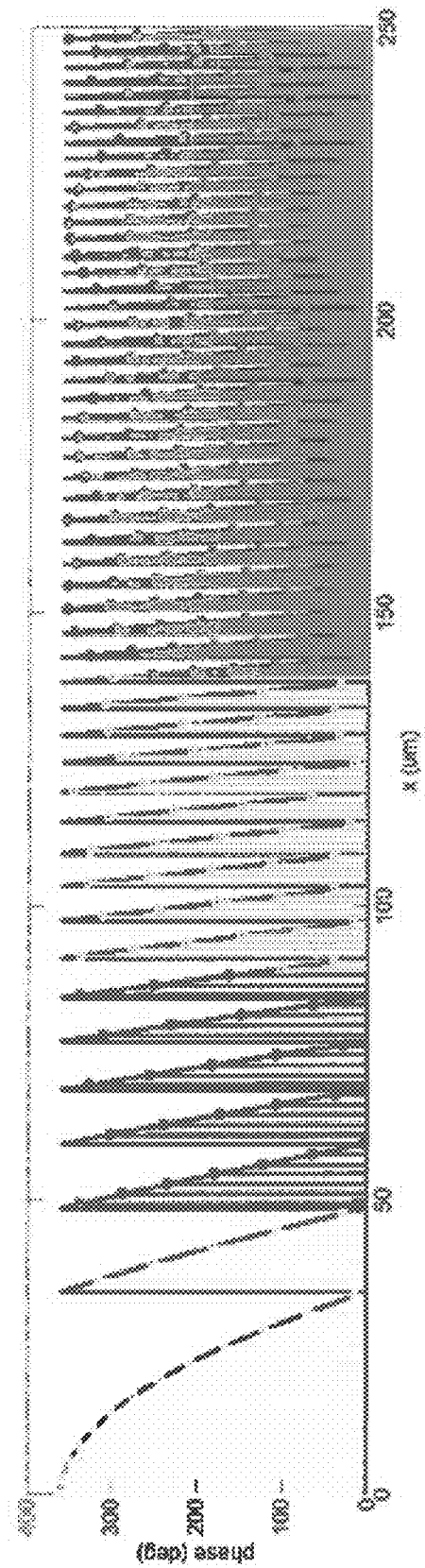
FIG. 12 is a simulated plot of phase versus radial position for one example of a one dimensional (1D) metalens with a structure consistent with that of FIG. 7.

To demonstrate the performance of such a lens design reference is made to FIG. 12, which is a simulated plot of phase versus radial position for one example of 1D metalens with a structure consistent with that of FIG. 7, where $r_2=0$. For the purpose of the simulation, a 1D metalens that has a 1 mm focal length, and which includes a metasurface formed from SWHCG that in turn is formed from a hexagonal Bravais lattice of cylindrical $TiO_2$ nanopillars was used, where the duty cycle was fixed over a certain number of unit cells, but was allowed to vary amongst different groups of unit cells. More specifically, the duty cycle was allowed to vary as x increased, while the fundamental period $\Lambda$ of the unit cells remained constant. It is noted that $TiO_2$ was chosen for the simulation because it has one of the highest refractive indices in the visible region of the spectrum, is relatively easy to deposit as a thin film (even in its amorphous form), and is relatively amenable processes that may be practicably used to form the nanopillars, such as etching, photolithography, and the like.

As shown in FIG. 12, the phase produced by the simulated 1D lens was sampled at several points within each portion of the metasurface that provided a $0-2\pi$ phase shift, as indicated by the dots. At any given sample point, several periods of the SWHCG were used, where the SWHCG period number is defined as the number of rectangular unit cells with a fixed duty cycle that were used to generate a particular phase sample point along the x dimension. In the case of a 2D lens, one can use the number of unit cells in both x and y directions as the SWHCG period number. The number of SWHCG periods (i.e., the number of fixed duty cycle unit cells) used for each sample point is differentiated by the different shading of the phase profile in FIG. 12, with the number of SWHCG periods decreasing with increasing x. Using this approach, one can maximize the resonant effects of the SWHCG array in each phase jump $(0-2\pi)$ zone so as to elicit a desired phase response and transmission. The SWHCG may also permit accurate reproduction of the sampled phases. Simulations also show that as the number of SWHCG periods drop below a threshold number (e.g., three), one can still achieve a strong phase variation by modulating the duty cycle of the unit cells within a hexagonal subwavelength array, but transmission falls. It may therefore be desirable to keep as many SWHCG periods as possible to maintain high lens transmission.

The specific sampling design shown in FIG. 12 shows that the phase in the first phase jump zone (i.e., x ranging from 0 to about 35 microns) can be sampled quite finely (e.g., with ~9 different phase samples). Moreover, the width of the first zone is sufficient to permit 5 SWHCG period s at each phase sample. As x increases, however, the phase sampling becomes coarser. Eventually (i.e., at some threshold value of x), only one SWHCG period per phase sample is able to fit into a given phase jump zone. Moreover in some instances, relatively few (e.g., three or fewer) phase sample points can be taken at high values of x. Note that for this simulation, when the radial position becomes significantly greater than the focal length of the lens, the width of each phase jump zone becomes close to $\lambda_o/n_m$. In such instances it may not be possible to sample above the Nyquist criterion, and thus may represent a limit for the numerical aperture of a particular lens design. Put in other terms, as one moves radially outward from the optical axis of a lens having a design similar to that of FIG. 12, the $0-2\pi$ phase shifts imparted by the nanostructures may become so close to one another that it is not possible to sample the phase in accordance with the Nyquist criterion.

Simulations were performed to determine the ability of a 1D metalens (equivalent to a refractive cylindrical lens) having the design of FIG. 12 to collimate light from a point source in one dimension. The results are provided in FIG. 13. Although the simulations were performed only in one dimension (sufficient computing capability was not available to the inventors to compute the results globally), it is expected that any given annular ring of the metasurface of the simulated metalens will exhibit performance similar to the simulations reported in FIG. 13. It is therefore expected that the results in FIG. 13 are a reasonable approximation of the ability of the metalens to collimate light of the indicated wavelengths in two dimensions.

Figure 13:
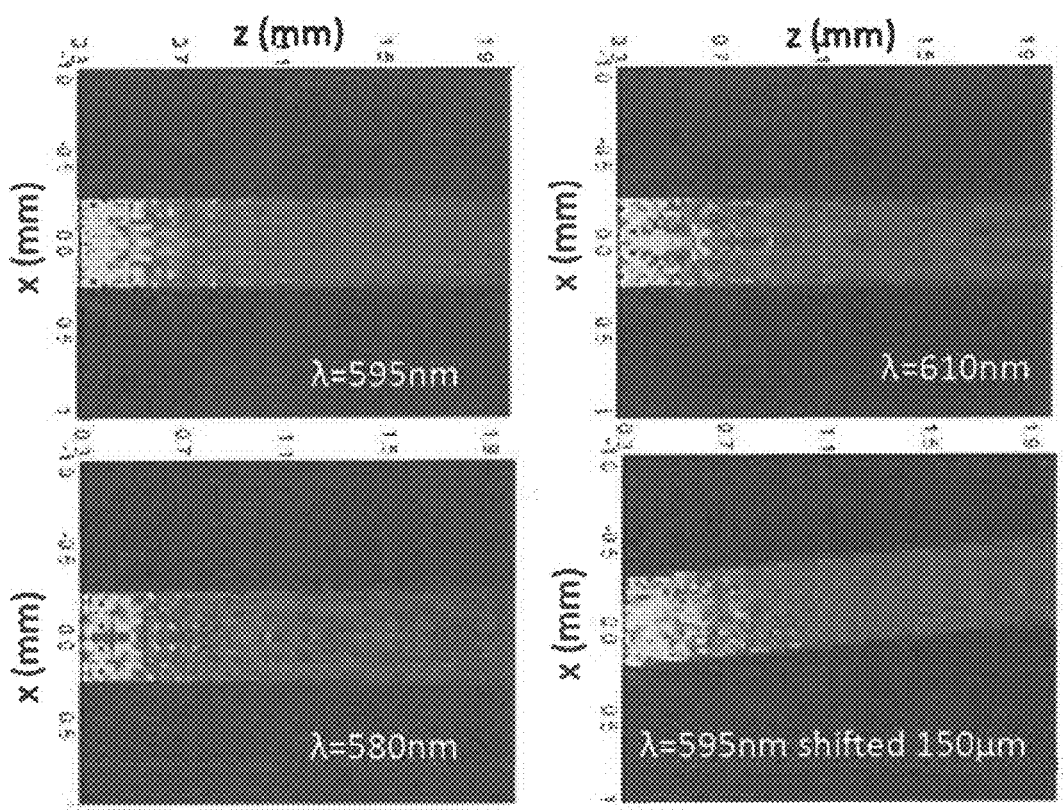
FIG. 13 depicts results obtained from simulations performed to determine the ability of a 1D metalens having the design of FIG. 12 to collimate light from a point source in one dimension.

The simulation results in FIG. 13 show that a metalens design consistent with FIG. 12 is expected to provide a high degree of collimation for visible light over a design wavelength range of 595-610 nm, which is a useful band for a range of phosphors and light emitting diodes. Simulation results at a test wavelength of 580 nm outside of the design region also show a high degree of collimation (1.1° full-width half-maximum of the central lobe) and lens transmission of 82.5%. Accordingly, metalenses with an even broader collimating wavelength range are expected and are contemplated by the present disclosure, although potentially with some degradation in collimation and lens transmission. The simulation results also show that as the point source was shifted on the focal plan from the optical axis of the lens to 150 microns below the optical axis, the angle of the collimated beam shifts in manner that is expected by geometric optics. It is noted that while the simulations assumed that light from the light source was incident on the substrate side of the metalens (with parallel rays exiting the metasurface side of the lens), similar performance is expected if the light was incident on the metasurface side of the lens. Moreover, similar performance is expected in from a lens design that incorporates a hexagonal Bravais lattice with a duty cycle that continuously changes, rather than a fixed duty cycle in a limited number of SWHCG periods. Use of a continuously variable duty cycle may have reduced diffraction artifacts, further improving lens transmission into a desired phase-space.

It can be seen from equation (II) that as the angle of the incident light from a point light source centered on the focal point, increases (i.e., as numerical aperture (NA) increases), the phase shift per unit radial distance begins to approach $2\pi n_m l/\lambda$. Thus at high numerical aperture annular regions the unit cell period $\Lambda$ becomes a large fraction of $\lambda n_m$. Therefore sampling rates of the phase (number of samples in a phase jump (0–2$\pi$) zone) for even one grating period approach the Nyquist criterion. It is therefore expected that high-quality collimation of high angle incident rays will eventually become difficult using a SWHCG that have a fixed fundamental period. To compensate for the increased angle of incidence, one can reduce the fundamental period $\Lambda$ of the unit cells by shrinking the lattice constants ($a_1$, $a_2$, etc.) thereof as one moves radially outward from the optical axis of the lens, while reducing the diameter $d_1$ of the nanostructures.

Another aspect of the present disclosure therefore relates to a metalens that includes a plurality of annular SWHCG regions, wherein the fundamental period $\Lambda$ of each the unit cells in the SWHCG array can vary with the radius of the lens. Put in other terms, unlike the previous aspect (in which the fundamental period $\Lambda$ of the unit cells was fixed) in this aspect the fundamental period $\Lambda$ of the unit cells forming the SWHCG are allowed to vary, e.g., by positioning the nanopillars 910 closer or further away from one another while retaining the geometry of the unit cell. At the same time, the duty cycle of the unit cells may be varied by altering the diameter $d_1$ of the nanopillars, as previously discussed. Example metalenses in in accordance with aspect this aspect may therefore include a metasurface formed of a SWHCG array defined by a hexagonal Bravais lattice of unit cells that include cylindrical nanostructures 910 (e.g., as shown in FIG. 9A), wherein the fundamental period $\Lambda$ of the unit cells varies as one moves radially outward from the optical axis of the metalens. More specifically, the lattice constants ($a_1$, $a_2$, etc.) of the unit cells 820, 830, may become increasingly small (i.e., the pillars 910 may be moved increasingly close to one another) as one moves radially outward from the optical axis.

One advantage of this approach is that it can enable the production of metalenses that exhibit very high numerical aperture (NA significantly greater than 0.5, such as NA>0.8 or even >0.9 or more), as compared to metalens designs in which the fundamental period of the unit cells is held constant. However, such advantages may entail the use of unit cells with a larger duty cycle and/or fitting smaller diameter pillars ($d_1$) into a smaller period. The overall performance of such metalenses may therefore be negatively affective in terms of lens transmission.

Using this approach a 2D metalens can be designed. As one example, a metalens which has diameter (D) of 4 mm with a 1 mm focal length and a numerical aperture of 0.89 for visible wavelength collimation above 500 nm can be designed using a hexagonal lattice of fixed period unit cells ($\Lambda$=250 nm) throughout the entire 2D metalens surface for a source in air, and a continuously varying duty cycle. The relationship between phase and duty cycle may be determined from 2D simulations, analogous to FIG. 10 for a 2D hexagonal lattice of fixed duty cycle unit cells. The height of the nanostructures (e.g., pillars) $h_1$ in the unit cells may be controlled to achieve a compromise between lens transmission and required duty cycle range. Alternatively, as an example, one could use a larger period $\Lambda$=325 μm near the center of the lens, e.g., within the first 250 μm, and then decrease the period to $\Lambda$=250 μm at radial distances exceeding 250 μm.

Figure 5:
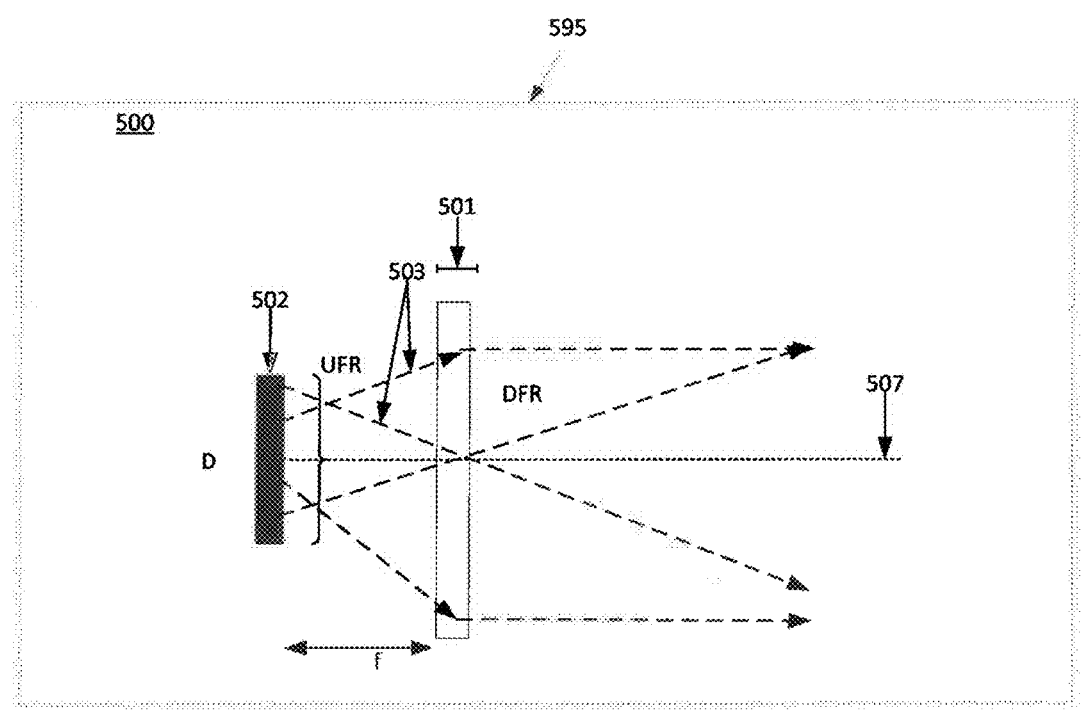
FIG. 5 depicts one example of an LED collimation system including a collimating metalens consistent with the present disclosure.

Such a lens may be particularly suitable for use as a collimating optic in an LED collimation system such as the one shown in FIG. 5, and may produce a beam divergence ($\theta$) of about 27° (where $\tan \theta = D/2f$). Moreover, the metalens can be designed with the metasurface on the exit side, thereby enabling it to be bonded directly to a light source (e.g., light source 502) such as an LED, e.g., with an adhesive. Without limitation, the adhesive used is preferably one with low refractive index, so as to minimize the impact the adhesive on étendue. Alternatively, one can also bond the metalens substrate with higher refractive index adhesive, but use a lower index substrate material (fused silica for example). Either method will limit the étendue gain of the LED compared to direct transmission into air. Bonding the metalens 501 to the light source can also provide an additional heat path for cooling the light source 502. Of course, the metalens may also be used in the arrangement shown in FIG. 5, wherein an air gap is present between the light source (LED) 502 and the metalens 501. The collimated beam exiting the metalens into air will be at the (e.g., lowest attainable) étendue of the LED (light source 502 emitting directly into air, so that the collimation angle is the narrowest possible from the light source 502.

The foregoing discussion has focused on embodiments in which a metalens has a single region (e.g., a first region 701) that includes a hexagonal Bravais lattice of unit cells that define a SWHCG, and wherein the geometry of the unit cells in the lattice in each region is uniform throughout the lens but the duty cycle has been allowed to vary. The discussion has also been extended to lenses that include two or more hexagonal lattice regions, wherein both the duty cycle and period of the unit cells has been allowed to vary. Although the lenses described above are useful and may be designed with a high collimation angle, their use of a fixed unit cell geometry may impose some limitations that may be undesirable for some applications. For example, the radial locations at which the phase is sampled may be incommensurate with the phase jump locations, and may therefore entail the use of small lattice periods at high NA locations to maintain the Nyquist criterion. The inventors have recognized that such challenges can be addressed by a metalens design that includes multiple regions, wherein the geometry of unit cells within each region need not be the same.

Another aspect of the present disclosure therefore relates to collimating multiregion metalenses wherein the unit cell geometry of the metasurface is not fixed throughout the lens. Such lenses may have a general structure consistent with FIGS. 7, 8, and/or 11, wherein the unit cell structure in the first region 701 (i.e., the structure of the first unit cells 820) differs from the unit cell structure (i.e., the structure of second unit cells 830) in the second region 703 or subregions thereof. More specifically, in some embodiments the first region of the such metalenses include a SWHCG array of first unit cells having a structure consistent with that of FIGS. 9A and 9B, wherein the fundamental period of the unit cells is fixed throughout the first region 701. In contrast, the second region of such metalenses includes an array of unit cells of a different structure than that shown in FIGS. 9A and 9B.

In some embodiments, the precise structure of the SWHCG array of first unit cells 820 in the first region 701 is designed to impart a phase shift to light over a certain numerical aperture (angular extent) on the metalens, wherein the (first) phase shift is a first type of approximation of a target hyperboloidal phase, e.g., as defined by equation IL Non-limiting angular extents for light emitted by a point light source at the focal point of the metalens for the first region 701 include but not limited to 10°-20°. In some embodiments, the first region 701 may be understood to have a numerical aperture in the range of 0.17<NA<0.34. In contrast, the metasurface in the second region 703 (or, more particularly, the unit cells therein) may be configured to impart a (second) phase shift to light that is incident at higher angles (e.g., angular extent ranging from greater than 20° to 70° or more), wherein the (second) phase shift is a second type of approximation of the target hyperboloidal phase that is different than the first type of approximation.

As demonstrated by FIG. 6, the target hyperboloidal phase shift defined in Equation (II) proximate the optical axis of a metalens becomes very close to a sawtooth phase shift at higher NA regions. The inventors have recognized that a perfect linear phase corresponds to a prism which bends light at a fixed angle with 100% efficiency. That is, the sawtooth phase-shift at higher NA corresponds to a prism with 2π (or higher order) phase jumps, as well as to the shape of a blazed diffraction grating. The inventors have therefore conceptualized the substantially locally periodic sawtooth phase shift occurring at higher NA as corresponding to a local grating with a local period that is dictated by the location of the phase jumps. Equivalently, the inventors have considered each small azimuthal region of a few radial phase jumps to correspond a local "blazed" grating that diffracts a ray from the focus of the lens into its −1 order, producing a collimated ray. With that in mind, the inventors recognized that a metalens providing a phase shift similar to that of FIG. 6 may be obtained by designing the lens with a central (first) region that includes a SWHCG grating, and one or more annular (second) regions at higher NA that include nanostructures approximating the function of a diffraction grating. In operation, the two regions cooperatively act to generate a target hyperboloidal phase.

The inventors also recognized from equation (II) that the radial locations of diffraction gratings formed by nanostructures can correspond precisely to phase jump locations in the hyperboloidal phase. More precisely, the radial location of the phase jumps where nanostructures defining a diffraction grating configuration should be inserted is at radii $r_m$, where $r_m$ is defined by equation (V) below:

$$r_m = ml\lambda_0 \sqrt{1 + 2f/ml\lambda_0} \qquad (V)$$

As before, l is the number of 2π phase shifts per phase jump. In some instances l=1 to minimize cylinder height, but certain advantages for l>1 exist and are discussed in connection with certain example embodiments.

The use of a metasurface that includes multiple regions with different geometry can provide considerable advantages. Within the first region 701, the phase varies relatively slowly so that it makes sense to sample the phase with high resolution for best fidelity. SWHCG structures such as those described herein are well suited for this purpose. However, it may be difficult to utilize such structures to provide high quality collimation of light at high angles of incidence (high NA), as discussed above.

In contrast, radial diffraction grating structures are well suited to provide a sawtooth phase at high angles of incidence (i.e., in the second region 703 and subregions thereof), but it may be challenging to use such structures to provide the full hyperboloidal phase shift, as may be desired from the first region 701. While it is possible to design a metalens in which an radial diffraction grating of nanostructures is used in the first region 701, as well as in the second region 703, the desired hyperboloidal phase near the center of the metalens may not be well presented. Put differently, the desired hyperboloidal phase in the first region 701 (see, e.g., equation II and FIG. 6) deviates far from the linear sawtooth behavior, and may be difficult to be well approximated by the linear phase produced by an array of nanostructures having an radial diffraction grating structure. Furthermore as a radial diffraction grating structure converges to the lens center, numerous "grain boundary" slips may be needed to accommodate the needed Nyquist azimuthal sampling, leading to a large number of spurious diffraction "defects" and reduced collimation fidelity. The inventors have therefore determined that a hybrid metalens using an array of nanostructures defining a SWHCG structure in the first region 701 proximate the optical axis (i.e., at a first, relatively low, NA) and an radial diffraction grating in the second region 703 (i.e. at a second NA higher than the first NA) can provide improved collimation fidelity, as compared to a metalens that includes only SWHCG or radial diffraction grating structures.

Another strong advantage of the mixed geometry approach is it can significantly improve the ability of lens designers to simulate the full 2D lens numerically. Therefore unlike previous metalens structures, optimization of the global structure and performance for the hybrid lenses described herein may be performed with significantly less computing resources, particularly at high NA. Put differently, it may be desirable to globally optimize the full three dimensional (3D) structure and performance of metalenses that are based solely on the fixed lattice approach. However, accurate simulations require full 3D simulations of the entire structure of the lens, i.e., ab-initio approaches such as finite-difference finite-time (FDFT) or finite-element (FEM). For metalens diameters on the order of a few millimeters, this implies a simulation on the order of $10^9$ elements, which can require intensive large-scale computing.

In contrast, optimizations of the hybrid designs described herein can be streamlined by leveraging symmetries and other properties of the nanostructure array used in the second region 703. Specifically, in the hybrid approach the array of nanostructures in the second region 703 can be in the form of a radial diffraction grating that includes nearly radially periodic arrays of nanostructures. The inventors therefore recognized that one can approximate the performance of each local grating area based on a similar infinite grating of a fixed period with little error. This approximation is believed to be justified in the near-field because only near-neighbor interactions between nanostructures in the diffraction grating structure are believed to be important. Far-field performance can therefore be predicted on the basis of diffraction theory applied to the local near-field calculations.

Fast computational methods such as rigorous-coupled wave analysis (RCWA) can therefore be used for each local diffraction grating in the second region 703 (i.e., for subregions 1103, 1105, etc. as shown in FIG. 11). The structure of each local diffraction grating (e.g., subregion 1103, 1105, etc.) can be optimized for diffraction into the desired order (e.g., −1 order) with the expectation that the optimization will be a close approximation of the global optimization such a structure.

With regard to the first region 701, because the location of the 2π phase jumps in the case of a fixed period hexagonal lattice (i.e., a SWHCG formed of a hexagonal array of first unit cells as described above) will be essentially random, the overall structure of the SWHCG structure does not have local periodicity. In many instances, the aperiodicity in duty cycle of such a nanostructure array would require a full ab-initio simulation to optimize. However, the inventors recognized that when many periods of the SWHCG in the first region 701 occur within a single phase jump zone, one can again use a local period simulation to determine the local phase and amplitude of the scattered light, greatly reducing computational load. Such simulations amount to roughly to simulating the phase by linearizing the hyperboloidal phase at each point within the phase jump zone(s) near the center of the lens, with the results being a fairly good representation of the final behavior of the SWHCG structure in the first region 701. Of course in some instances, the first region 701 may be sufficiently small as to be amenable to a full 3D simulation, which could then be stitched to the local periodic simulations used to optimize the second region 703.

Further details regarding the manner in which the nanostructures within the second region 703 can be optimized is now provided, with reference to an example second unit cell 830 that may be included in the second region 730 of a hybrid multiregion metalens consistent with the present disclosure. As an initial matter, it is noted that unlike a first region 701 containing a SWHCG of nanostructures, optimization of the transmission into the −1 order of each radial diffraction grating in the second region 703 can provide near optimal conditions for the entirety of the second region 703. This is because the near periodic geometry of the nanostructures in the second region 703 implies that a simulation of any given radial diffraction grating (e.g., any of subregions 1103,1105, etc.), with periodic boundary conditions, will be very close to the physical configuration of that radial diffraction grating within the second region 703 in a physical reproduction of the metalens.

Figure 14:
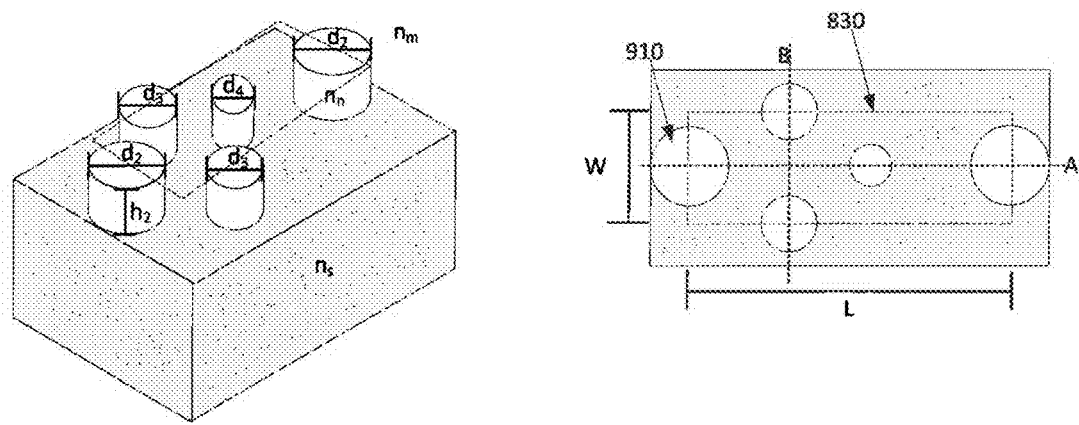
FIG. 14 depicts perspective and top down views of another example of a unit cell consistent with the present disclosure.

Reference is now made to FIG. 14, which depicts one example of a rectangular unit cell geometry that may be used as a second unit cell 830 in the second region 703 of a hybrid multiregion metalens consistent with the present disclosure. In this illustrated example the rectangular second unit cell 830 includes a plurality of nanostructures 910, wherein each individual nanostructure 910 has a geometry consistent with the foregoing discussion. In some embodiments, the nanostructures 910 in the second unit cell 830 are in the form of cylindrical nanopillars, wherein each Nano pillar has a height ($h_2$) and a diameter ($d_1$, $d_2$, $d_3$, $d_4$), wherein such dimensions may be the same or different between respective pillars in the second unit cell 830.

More particularly, in this example the unit cell 830 includes at least a portion of five nanostructures 910, wherein three of those nanostructures 910 are laterally offset from one another along a first axis (A), and two of those nanostructures 910 are laterally offset from one another along a second axis (B), wherein the second axis (B) is normal to the first axis (A). Each unit cell shares multiple nanostructures 910 with adjacent unit cells. Each second unit cell 830 also has a length (L) and a width (W) (as shown in FIG. 14 and FIG. 8) which may be determined by optimization calculations in the design phase, as discussed herein.

Returning to the discussion of optimization, local optimizations can be performed on a unit cell 830 as shown in FIG. 14, so as to define a plurality of subregions within the second region 703, e.g., as shown in FIGS. 8 and 11. As further shown in FIG. 8, in some embodiments the second unit cells within a particular annular subregion have a periodic azimuthal arrangement. As best shown in the zoomed in portion of FIG. 8, in some embodiments the second region of a hybrid metalens may include "grain boundaries" or "slips" 860 (i.e., regions where the unit cell arrangement discontinuously changes) between adjacent annular subregions, so as to keep the dimensions of the of the unit cells 830 within each annular region similar to one another.

It is noted that while FIG. 14 depicts one example of a second unit cell 830 that is rectangular in shape and is defined by five nanostructures 910, the shape of the second unit cells 830 and the number and position of the nanostructures included therein is not limited to that configuration. Indeed, the optimization of the second region 803 can enable the use of different second unit cells structures, wherein the shape, dimensions, and locations of nanostructures within the second unit cells differs from that of FIG. 14. Indeed the number of elements used in a second unit cell, their shape, dimensions, and locations within the cell are all free parameters that may be varied.

Figure 15A:
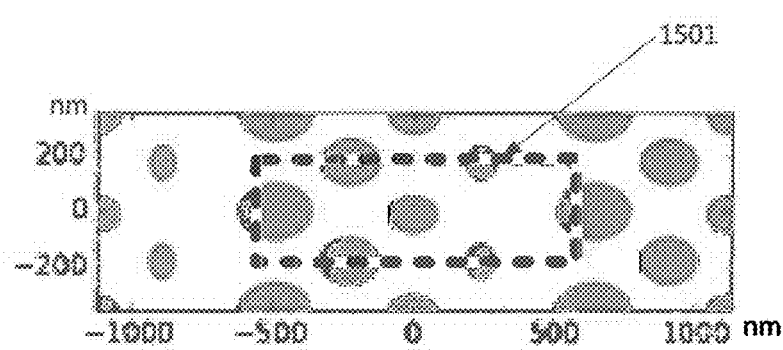
FIGS. 15A-15C depict alternative unit cell configurations consistent with embodiments of the present disclosure.
Figure 15B:
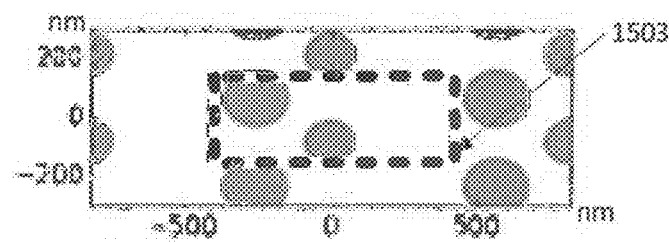
Figure 15C:
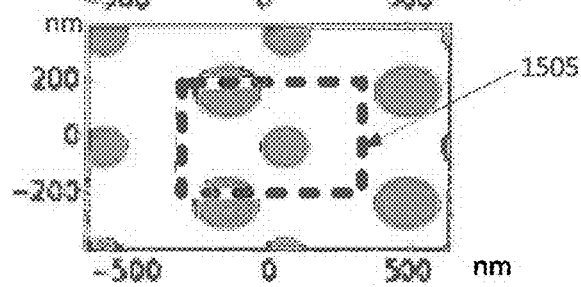

In that regard reference is made to FIGS. 15A-15C, which show different second unit cell configurations that may be used to form radial diffraction structures within the second region 703. Such structures may be used, for example, in the production of a second region 703 of a metalens that is optimized for incident light having a wavelength in the visible, such as 580 nm. As can be seen, the second region can include a plurality of different radial diffraction structures (e.g., in annular subregions (1103, 1105, 1107, 1109, 1111, 1113 within the second region 703, as shown in FIG. 11), wherein the unit cells within each annular subregion differ from one another.

The unit cells 1501, 1503, 1505 all differ from one another in terms of size and number of nanostructures, and in terms of the arrangement of nanostructures within each unit cell. For example, the unit cells structures of FIG. 15A may be used to produce an annular radial diffraction grating that calculations indicate will bend 580 nm light by 31° with an efficiency of 90%, whereas the structures of FIGS. 15B and 15C may be used to produce respective annular radial diffraction gratings that calculations show will bend 580 nm light by 45° (efficiency of 83%) and 65° (efficiency of 68%), respectively. This suggests that unit cells within each annular subregion of the second region 703 (e.g., subregions 1103, 1005, etc.) may differ from one another, and may be optimized to provide different optical performance.

Similar variability can also exist with regard to the shape of the nanostructures within each of the annular subregions. That is, each subregion within the second region 703 may include an array of second unit cells 830, wherein each subregion includes unit cells that may be of the same or different geometry as unit cells within another of the subregions. For example, unit cells within the subregions may have the same overall geometry, but may differ in duty cycle. Alternatively or additionally, unit cells within different subregions may have differing geometry. Furthermore the nanostructures within one or more subregions may take on different shapes, such as the elliptical cylindrical pillars in FIGS. 15A-C versus the circular cylindrical pillars of FIG. 14. Those additional degrees of freedom may be leveraged to enhance performance of a metalens design. For example, a calculated transmission curve versus angle of incidence for a metalens that includes annular regions that respectively include an radial diffraction grating formed from unit cells 1501, 1503, or 1505 shows that such a lens can exhibit roughly greater than 70%-90% transmission into the desired −1 order for the optimized designs using elliptical elements.

Another point of note is that by using radial diffraction grating structures, relatively simple optimization algorithms known in the art can be used to optimize the performance of the second region 703 of the metalens. Such algorithms include but are not limited to local optimization algorithms such as gradient search methods, hill climbing, trust-region methods, and many others. Global optimization algorithms may also be used, and may provide further advantages to providing best optimization at the cost of computation resources and/or time. Non-limiting examples of global optimization algorithms that can be used include simulated annealing, genetic search algorithms, various heuristic search methods, sequential quadratic programming, and others.

Note that in many of those algorithms, one can apply constraints ("fabrication constraints) that are supportive of physical fabrication of a metalens design. Examples of such fabrication constraints include limiting the dimensions of nanostructures, unit cells, etc. satisfy manufacturing constraints, such as lithography constraints, constraints on physical refractive index (if part of optimization), geometric constraints, constraints on number or shape of elements, and other constraints that may apply to the particular problem. The optimization metric can be chosen to be the power of the diffracted light into a particular order (usually −1), given some range of incident angles (which depend on source size), although other choices may be applicable.

Using the above optimization and design approach, a hybrid metalens including a first region 701 and a second region 703 with varying unit cell geometry was designed for optimized collimation of 580 nm input light, which is near the peak emission wavelength of many yellow phosphors used for LEDs or LARD. The design considerations assumed a maximum angle of incidence for light propagating in air of 70° ($n_m=1$) and a numerical aperture of 0.96. The basic structure of the lens is shown in FIG. 11, in that a first region 701 and a second region 703 including a plurality of subregions 1103, 1105, 1007, 1009, 1111, and 1113 were used. The metasurface in the first region 701 was a SWHCG formed by a hexagonal Bravais lattice of unit cells having a configuration consistent with FIGS. 9A and 9B. The metasurface in the second region (or, more particularly, each subregion 1103, 1105, etc.) was formed from an array of unit cells defining a radial diffraction grating structure. It is noted that the nanostructures in the second region 703 in this embodiment were elliptical or circular nanopillars with a height of height 550 nm. The lens had a diameter of 1.1 mm and a focal length of 200 μm with the metasurface facing the incident source and being formed on a glass substrate.

The first region 703 included a SWHCG formed from a hexagonal Bravais lattice of uniformly spaced unit cells consistent with the structure of FIGS. 9A and 9B, and extended out to NA=0.25. For this example design, the second region 703 was broken into six annular subregions separated by 6 grain boundaries 860 as illustrated in FIG. 11. The length (L) of each unit cell within a respective one of the radial diffraction gratings (i.e., within each subregion 1103, 1105, etc.) in the second region 703 was determined using equation (VI) below, which is for the −1 order:

$$L = \frac{\lambda_0}{\sin\theta}, \quad (VI)$$

in which θ is the angle of incidence of a ray from the lens focal point at distance f to a point on the meta-lens surface and the free-space wavelength of the source light is $\lambda_0$.

The width (W) of each unit cell within a respective one of the radial diffraction gratings in the second region 703 cell was determined using formula (VII) below:

$$W = \Delta\Phi f \tan\theta \quad (VII)$$

where $\otimes\Phi$ is the angular width of the unit cell in the azimuthal dimension. Because the second region 703 included a plurality of annular subregions (1103, 1105, 1107, etc.) that smoothly vary between "slips" or "grain boundaries" 860, $\Delta\Phi f$ was a constant. Moreover in this example design, the cell width W was initially fixed at the beginning of each grain boundary (i.e., at the boundary of a subregion that is closest to the center of the metalens). The starting width dimensions for W in this instance were approximately 400 nm. However the width values may vary and may be dictated by the minimum feature size for the chosen nanostructuring method. In some instances the width values are below $\lambda_0$ to eliminate spurious propagating radial diffraction orders.

The radial position, $r_g$ of grain boundaries 860 between adjacent annular subregions in the second region 703 were determined using equation VIII below:

$$\tan\theta_g = \frac{r_g}{f} \quad (VIII)$$

Wherein $\theta_g$ is angle of incidence for a ray emanating from the focus which give a radial grain boundary position. From Equation VIII and the starting width W, the fixed azimuthal width $\Delta\Phi$ of the group of unit cells within annular subregion was determined. In general, the azimuthal width of each annular subregion (i.e., of subregions 1103, 1105, 1107, etc.) was allowed to change relative to the azimuthal width of other annular subregions, but remained fixed within a particular annular subregion.

In this example the minimum feature size $d_{min}$ of the nanostructures within the second region 703 was set at 100 nm, so as to account for practical limits of deep UV lithography. As a result, both L and W were limited to greater than 200 nm, assuming the cell consists of one cylinder and a space between a cylinder in a neighboring cell. The starting length L was determined by finding the angle of incidence from equation (VII) and substituting into equation (VI). Subsequent cell dimensions were determined by iteratively increasing W by 1% increments at increasing radial positions and generating the corresponding length (L) of the cell.

The number of nanostructures ($N_c$) used in a set of unit cells for a given annular region was determined by the minimum length ($L_{g\text{-}min}$) value at the highest radii of a given grain boundary region, is generally given by equation (IX) below.

$$N_a \leq \frac{L_{g,min}}{2d_{min}} \tag{IX}$$

Thus for a unit cell length of size L≈500 nm and a $d_{min}$ of 100 nm, at high NA regions of the lens nm the number of nanostructures is 2 according to Equation (DC).

It is noted that $N_c=2$ is also the minimum number of nanostructures per cell allowed by the Nyquist criterion. Therefore in some embodiments $N_c \geq 2$ for all regions of the lens to eliminate phase distortion from aliasing. It is also noted that while this example is based on a minimum feature size dictated by deep UV lithography limits, finer resolution is possible with other approaches including EUV lithography, e-beam lithography, nano-imprinting lithography, and other methods know in the art. Therefore the number of nanostructures for a high NA visible wavelength lens can be greater than 2, even at the outer regions of the lens.

In one example embodiment, a hybrid metalens consistent with the present disclosure was designed using a first region 701 that utilizes the unit cell design of FIGS. 9A and 9B. In this example, a hexagonal Bravais lattice of first unit cells 820 of the structure of FIGS. 9A and 9B was used, wherein the nanostructures 910 were circular pillars. The fundamental period Λ was $\Lambda=a_1=a_2=320$ nm, satisfying the sub-wavelength grating criteria of equation (IV) at the design wavelength $\lambda_0$ of 580 nm. The center of each of the nanostructures 910 in the first unit cells 820 in the first region 701 had a set of (x, y) coordinates that, when substituted into equation (II), gave a desired a desired phase shift. RCWA was performed using a commercially available program to calculate the phase shift and transmission of a periodic SWHCG of an array of first unit cells 820, while allowing the duty cycle (d/Λ) to vary. The result of those calculations produced a plot similar to that of FIG. 10. The diameter of the nanostructures 910 was then chosen by mapping each phase shift required at each cylinder position to the pre-calculated phase—duty-cycle relationship. The maximum diameter of the nanostructures 910 was 270 nm while the minimum diameter was approximately 100 nm for a phase shift difference approaching 2π. The resulting pattern near the x-axis and close to the center is shown in FIG. 16.

In the same example, the second region 703 of the metalens was designed using a near periodic radial diffraction grating structure, such as described above. More specifically, the second region included a plurality of annular subregions, wherein each subregion includes an radial diffraction grating. The grating structure of each annular sub-region within the second region 703 was optimized as previously described. The process starts at the end of the first region 701, i.e., at the intersection of the first region 701 and the first annular region 1103, as shown in FIG. 11. For this example the starting width W for unit cells within the first annular subregion (1103) was roughly 400 nm, and it was assumed that the unit cells included a fixed number of cylindrical nanostructures 910. For each unit cell within a given subregion, a width W is chosen by incrementing from an initial width at the beginning of the subregion. RCWA simulations were run at each width, varying the geometric parameters of a fixed number of cylinders, $N_c$, using periodic boundary conditions based on the current unit cell. The periodic boundary conditions assume that the near-field phase shift and transmission of the actual unit cell within the lens can be well-approximated by assuming the cell and its neighboring cells form a periodic lattice, as justified earlier. In this example the center location, major and minor axes lengths, and rotation of the nanostructures 910 were varied until the transmitted power of the −1 order was maximized, and powers into the other diffraction orders were minimized. For the purpose of the calculations, incident light in the form of a plane wave at angle of incidence θ with respect to the x-axis was used, and the unit cells in each annular subregion were aligned along their length.

The optimization calculations were performed at approximately every 1% increase in W within a respective annular subregion, and the process was repeated for each additional subregion (i.e., subregions 1105, 1007, 1009, etc.). For unit cells in between the 1% increases of the widths W, interpolation was used to determine the positions and dimensions of the nanostructures. To enforce a fixed phase that at the beginning of each cell ($\phi_0$ in Equation (II)], the transmission into the −1 order was multiplied by the sine of the phase imparted by the local grating into the −1 order, as measured from the center of each unit cell. This produced a final optimization metric for each annular subregion (local grating) and ensured that phase shift at the center of a unit cell was fixed at π/2 or $\phi_0=3\pi/2$, although the actual value could vary and such values are enumerated for the sake of example. Moreover, it should be understood that the degree to which W is incremented is not critical and can be adjusted according to computational resources and design needs.

Figure 16:
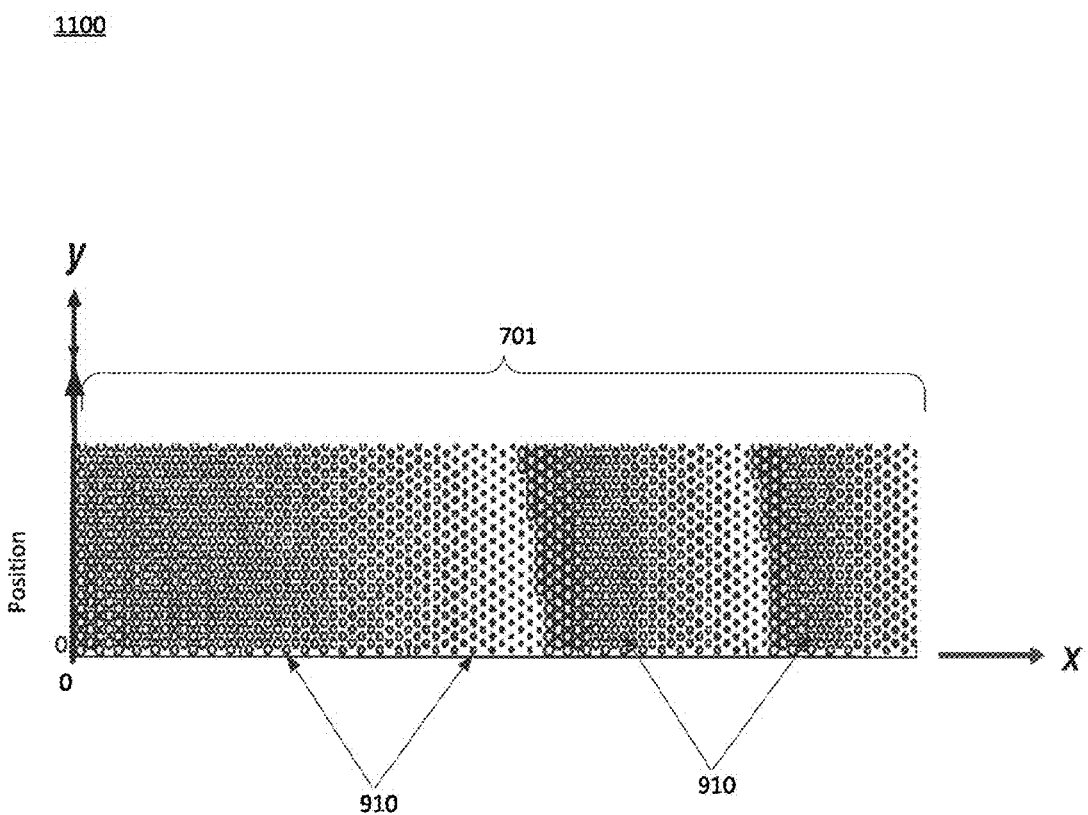
FIG. 16 depicts one example of a distribution of Hexagonal Bravais unit cells consistent with the present disclosure.

The foregoing process yielded a metalens that included a first region 701 formed from a hexagonal Bravais lattice of first unit cells 820 of the structure of FIGS. 9A and 9B, and the general distribution shown in FIG. 16, and a second region 703 including a plurality of annular regions, wherein each respective annular region included an radial diffraction grating formed by unit cells 1501, 1503, 1505, respectively as shown in FIGS. 15(A)-(C), with a first subregion including the unit cells 1501 extending annularly around the first region 1701, a second subregion including the unit cells 1503 extending annularly around the first subregion, and a third subregion including the unit cells 1505 extending annularly around the second subregion.

Figure 17:
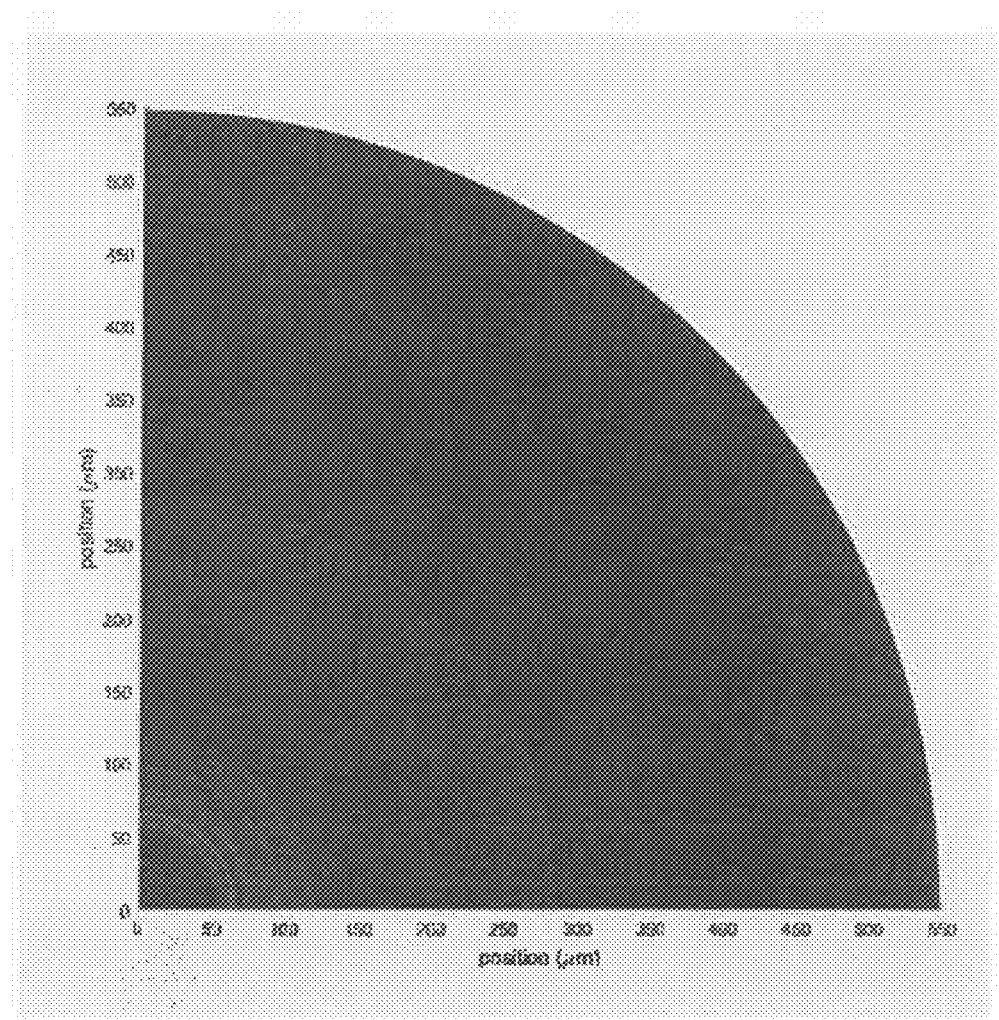
FIG. 17 depicts one example of a metalens having a multiregion design consistent with the present disclosure.

The performance of gratings formed by unit cells 1501, 1503, 1505 is described above. It is noted that unit cell 1501 consists of 4 pillars while unit cell 1505 has 2 pillars, coincident with the reduction in cell length L as required by Equation (VI), with L≈$\lambda_0$ (580 nm) as expected at the highest NA regions. Some selected values of elliptical cylinder dimensions and locations of grain boundaries is shown Table 1. The overall lens, showing region 1 in the center and the six grain boundary regions is shown in FIG. 17.

TABLE 1

Grain boundary regions for a hybrid metalens optimized for 580 nm collimation with 1.1 mm diameter and a focal length of 0.2 mm

| Design | Radial location of region (μm) | Number of pillars/ unit cell | Largest cylinder major axis diameter | Corresponding minor axis diameter | Smallest cylinder major axis diameter | Corresponding minor axis diameter |
|---|---|---|---|---|---|---|
| Hexagonal periodic lattice | 0-55 | 2 | 270 | N/A | 100 | N/A |

TABLE 1-continued

Grain boundary regions for a hybrid metalens optimized for 580 nm collimation with 1.1 mm diameter and a focal length of 0.2 mm

| Design | Radial location of region (μm) | Number of pillars/ unit cell | Largest cylinder major axis diameter | Corresponding minor axis diameter | Smallest cylinder major axis diameter | Corresponding minor axis diameter |
|---|---|---|---|---|---|---|
| Local grating | 55-72 | 5 | 278 | 220 | 176 | 107 |
| Local grating | 72-119 | 4 | 289 | 100 | 185 | 123 |
| Local grating | 119-200 | 4 | 272 | 213 | 135 | 100 |
| Local grating | 200-285 | 2 | 247 | 186 | 173 | 149 |
| Local grating | 285-346 | 2 | 284 | 197 | 169 | 169 |
| Local grating | 346-548 | 2 | 241 | 188 | 140 | 140 |

Figure 18:
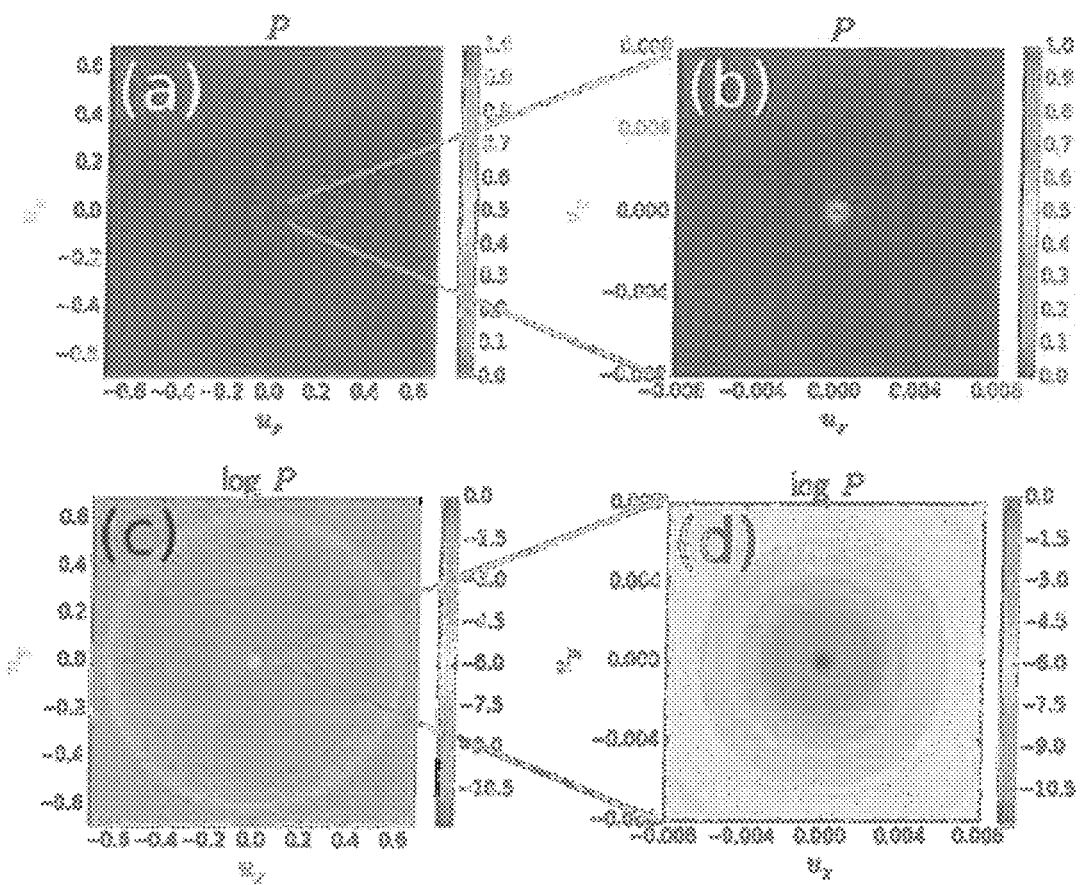
FIGS. 18(a)-(d) depict the calculated collimating performance of one example of a metalens design consistent with the present disclosure.
Figure 19:
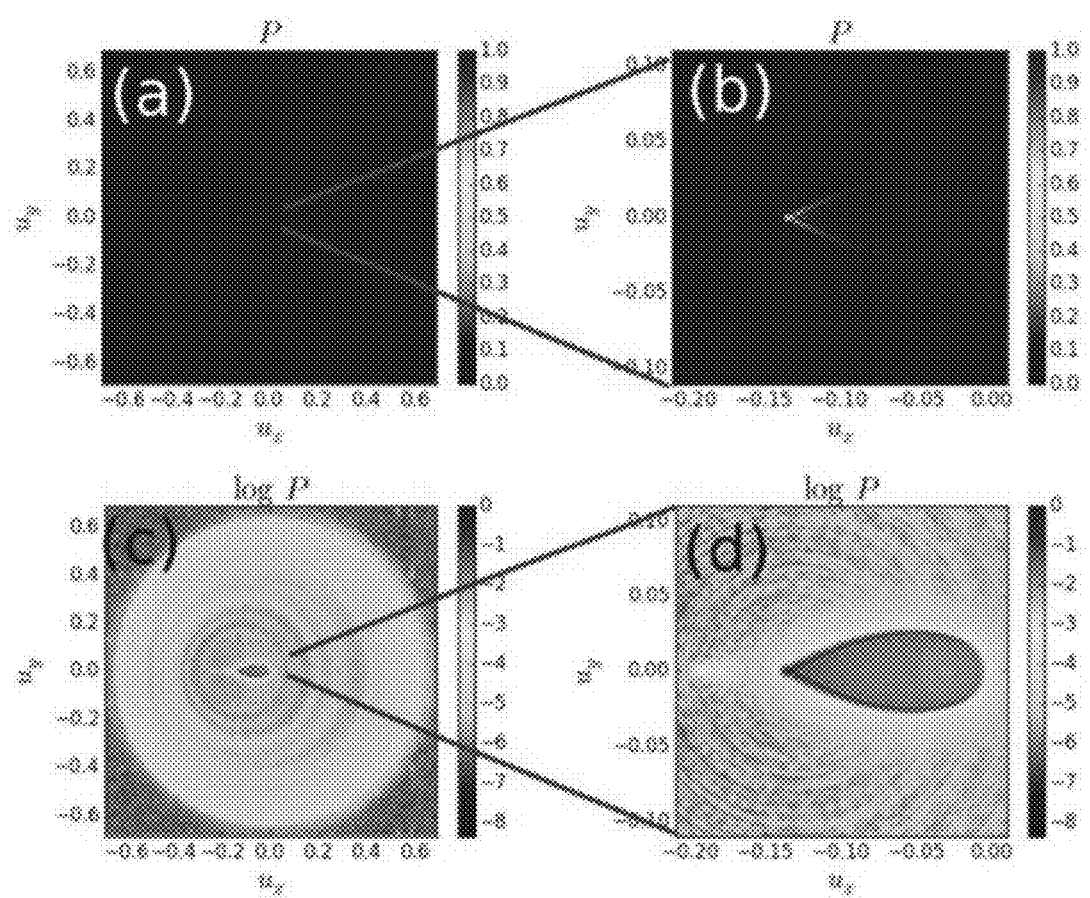
FIGS. 19(a)-(d) depict the calculated off-axis collimating performance of one example of a metalens design consistent with the present disclosure.
Figure 20:
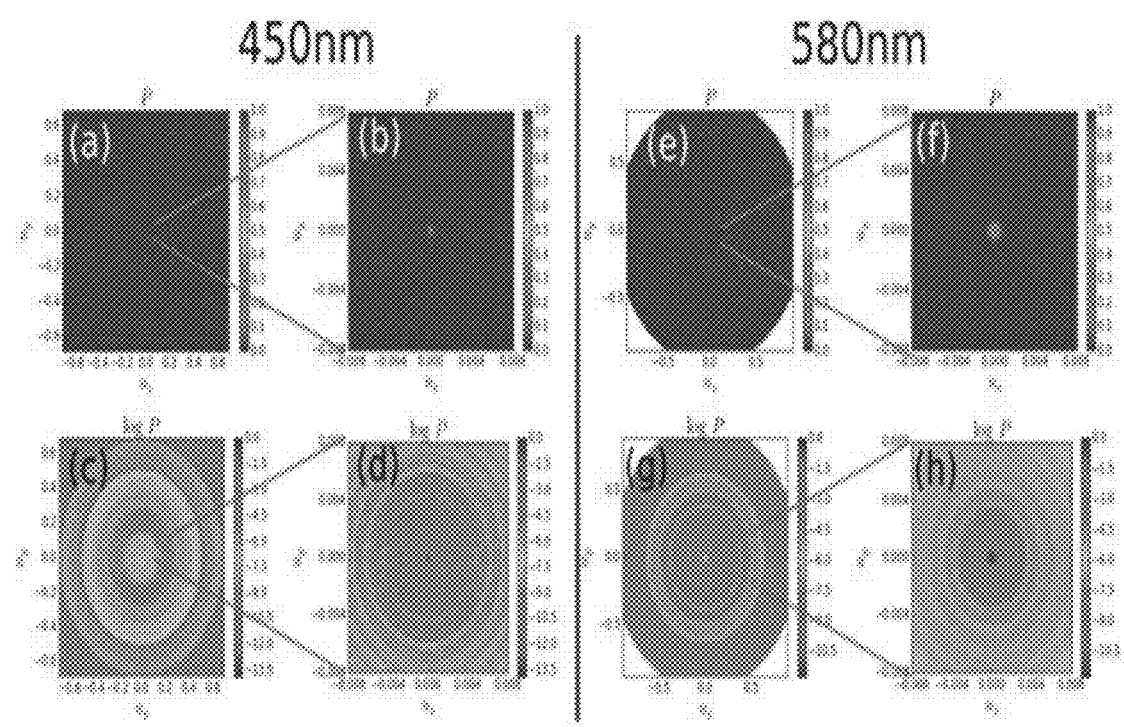
FIGS. 20(a)-(d) show the calculated performance of an example metalens design consistent with the present disclosure for a normally incident 450 nm plane wave.
FIGS. 20(e)-(h) show the calculated performance of an example metalens design consistent with the present disclosure for 580 nm light emanating from the focal point.

The calculated collimating performance of the metalens design shown in FIG. 17 and depicted in FIGS. 18(a)-(d), for a point source located at the focal point. The results show the far-field angular distribution where $u_x$ and $u_y$ are the x and y direction cosines in the glass substrate. It is noted that the limit of $\sqrt{u_x^2+u_y^2} \leq 0.65$ was due to the total-internal reflection (TIR) angle limit of light generated the glass substrate upon which the metasurface was formed, which can still escape into air. The calculations show 79% of the incident power is transmitted by the lens into the collimated region as shown in FIGS. 18(a) and 18(d); another 7% is scattered outside the collimated region as shown in FIG. 18(c).

The width of the collimated spot in the far-field is as expected from the diffraction limit of a 1 mm diameter hole. When the source is located off-axis from the focal point, but still in the focal plane, the light remains collimated in the corresponding off-axis direction, but contains aberrations. This is shown in FIGS. 19(a)-(d) for the source placed approximately 40 μm off the optical axis, corresponding to an angle of incidence to the center of the lens of 11.3°. From geometric optics, this leads to a collimated beam inside the silica substrate at an angle of 7.7° or $u_x$=0.134, as observed in FIGS. 19(b) and (d). The results also show the characteristic tear-drop shape of a coma aberration. Thus, for an extended source, corresponding to any real incoherent light source such as the LARP source or LED, the meta-lens in this example will collimate the beam with the expected geometric divergence. However, the coma aberration will primarily provide some angular mixing in the far-field, with little impact on the divergence angle.

In another example embodiment, the hybrid design approach was used to simultaneously optimize the radial diffraction gratings in each annular region of the second region 703 to have high lens transmission into different grating orders, depending on wavelength. The metalens in this example was designed for 580 nm focusing and 450 nm lens transmission whereby the 580 nm light was optimized for the normal −1 order to provide spherical aberration-free collimation, which 450 nm light was optimized for 0 order transmission. This is one example of a metalens configuration that can be used for the LARP application in FIG. 4, wherein the metasurface is configured to pass primary light provided by first light source 402 (e.g., a blue laser), while collimating the secondary light 415. Although not shown in FIG. 4, one may use external optimized focusing optics for the primary light rays 403 emitted by the first light source 402. Simulations were run for the lens design based on a 450 nm normal incidence plane wave, and the results are shown in FIGS. 20(a)-(h). FIGS. 20(a)-(d) show the calculated performance for a normally incident 450 nm plane wave. FIGS. 20(e)-(h) show the calculated performance for 580 nm light emanating from the focal point 580 nm light coming from the focal point.

In general, using the above approach one can consider many variations on the geometric scheme to achieve metalenses designs with various levels of optimization and designs for different applications. One can choose to optimize for high transmission over a wide wavelength range, minimization of chromatic aberration (achromatic lens), and other metrics that are feasible for single thin metalens. One is also not limited to a small number of finite rectilinear cells. Moreover, it is possible to populate the second region of the hybrid metalens with unit cells and unit cell arrangements that are different from those described above, including regular triangular, hexagonal tessellations or other irregular tessellations.

It is also noted that while portions of the foregoing discussion focuses on a hybrid design that includes two regions with different nanostructure array designs, the metalenses described herein are not limited to such designs. For example, one could use the radial diffraction gratings described above for the second region of a hybrid metalens as to form the entire metasurface, bearing in mind the challenges associated with such an approach near the central portion of the lens. To address this, a one could simply employ a metalens design with a pinhole in the center, rather than any meta-elements, non-periodic element locations and designs. Still further, a hybrid conventional Fresnel approach could be used to define a metalens with a first region including central or ring elements of shaped dielectric to define Fresnel zones, and a second region using the radial diffraction grating approach noted above.

Another embodiment of the present disclosure relates to metalenses designs in which the height of nanostructures in the unit cells of a metasurface there is extended to produce multiples of a phase shifts. This implies that/is greater than one in equation (II). Although this approach may lead to fabrication complexities, it can reduce chromatic aberration by reducing the overall number of phase jumps in the metalens. As wavelength shifts away from the central design wavelength, the phase jumps move away from exact multiples of $2\pi$ leading to additional scattering and undesired diffraction effects that degrade collimation.

As noted above, anti-reflection coatings may be deposited on the substrate surface or on the metasurface side of a metalens. With the foregoing in mind, another aspect of the present disclosure relates to metalenses that include a metasurface including an array of nanostructures, wherein an antireflective coating is deposited on a top surface of the nanostructures. For example, an antireflective coating may be deposited on the upper surface of each of the nanostructures 910 shown in FIG. 9A, 9B, or 14. Use of the antireflective coating can reduce the reflection of either incoming or outgoing light, depending on which side of the substrate light enters. This may also enhance transmission in the case of nanostructures that tend to operate as waveguides rather than resonators. Alternatively or additionally, highly reflective multi-layer coatings may also be useful to enhance the phase shift of the nanostructures through multiple passes without increasing cylinder height. This can be another method to improve chromatic effects by allowing for multiple 2π phase shifts within a phase jump as in the previous embodiment, but without greatly extending the length of the nanostructures.

In yet another example embodiment, one may consider different phase profiles than those that are given by Equations (I) and (II). For example, off-axis collimation with a metalens design that achieves the phase shift specified in Equation (II) can result in coma. To design a lens that may partially compensate for aberrations such as coma, one can determine the required phase profile needed by the metalens. For a single off-axis point source, the generalization of Equation (II) specified by Equation (X) below would yield the following phase profile that a meta-lens with focal length f should impart:

$$\Delta\phi(\rho, \Phi) = \underset{2k\pi}{\mathrm{mod}}\left[\frac{2\pi}{\lambda}n_m\left(f\cos\theta_0 + \rho\cos\Phi\sin\theta_0 - \sqrt{\rho^2 - 2f\rho\cos\Phi\tan\theta_0 + f^2/\cos^2\theta_0}\right)\right] \quad (X)$$

Here, the angle of incidence of the point source with respect to the optic axis is $\theta_0$, also the angle of the ideal collimated beam (See FIG. 21(a)). The parameters ρ and Φ (See FIG. 21(b)) are the distance from the optical axis and angle from the plane of incidence (meridional plane) at which the above phase is imparted by the metalens. The other variables are defined as above, except that λ in equation (X) is a free space wavelength (i.e., $\lambda_o$). Equation (X) therefore defines an ideal phase profile for collimating an off-axis point source.

By comparing Equations (V) and (X), it can be seen that one cannot make a single thin metalens that produces perfect on-axis and off-axis imaging for a spatially extended input light distribution because the required phase depends on where one is with respect to a given plane of incidence. Equation (X) would require the local metalens phase at each location to depend on the azimuthal angle of the plane of incidence. However, for a circularly symmetric source, one can have the less constrained phase by simply configuring the lens to collimate light from a point source inclined at an angle $\theta_0$ in only the plane of incidence. This is equivalent to setting the angle Φ=0 and creating a set of meta-lens elements only close to the plane of incidence. Rotating the plane of incidence of the point source in this way yields a desired phase over the entire meta-lens given by equation XI below:

$$\Delta\phi(\rho, \Phi) = \underset{2k\pi}{\mathrm{mod}}\left[\frac{2\pi}{\lambda}n_m\left(f\cos\theta_0 + \rho\sin\theta_0 - \sqrt{\rho^2 - 2f\rho\tan\theta_0 + f^2/\cos^2\theta_0}\right)\right] \quad (XI)$$

Such a design can produce a reasonable (albeit potentially aberrated) collimated beam for a ring source with angle of incidence. From the edge-ray theorem, it is expected that rays emanating from point sources (in focal plane) at angles of incidence less than $\theta_0$ would lie within the collimated ring generated by rays from point sources at $\theta_0$. This implies that a phase shift distribution as defined by Equation (XI) can provide a reasonable degree of collimation from a circularly symmetric extended source with maximum source size determined by angle of incidence $\theta_0$. Many variations on the scheme are possible that optimize phase profiles to optimize metrics for collimation.

One can also appeal directly to the local grating optimization of an off-axis point source to generate deflected rays from a radial line of local gratings at an azimuthal angle ϕ with respect to the incident ray. By constraining all local gratings to be independent of ϕ, one can optimize a ring of local grating cells at each radius ρ to produce a desired far-field ray bundle. Other phase distributions can also be designed by including, for example, a linear phase to further impart a beam deflection component.

Further details with regard to various considerations concerning the design of metalenses may be found in Steven J. Byrnes, et. al, "Designing large, high-efficiency, high numerical-aperture transmissive meta-lenses for visible light, Optics Express 5110-5124 (published Mar. 1, 2016); available online at http://arxic.org/abs/1511.04781 as of Nov. 17, 2015, the entire content of which is incorporated herein by reference. This article is cited for the purpose of reference and further detail only, and is not an indication or admission that it qualifies as prior art.

EXAMPLES

The following examples pertain to additional embodiments of the present disclosure.

Example 1

According to this example there is provided a multiregion hybrid collimating metalens (700), including: a substrate (303) having a first side (309) and second side (311); and a metasurface (305) formed on the first side (309) of the substrate, the metasurface including a first region (701) extending radially around an optical axis of the hybrid multiregion collimating metalens (700) and a second region (703) extending radially around the first region (701); wherein: the first region (701) includes an array of first unit cells (820) containing subwavelength spaced nanostructures (910), such that the first region (701) functions as a subwavelength high contrast grating (SWHCG); and the second region (703) includes an array of second unit cells (830), wherein the array of second unit cells (830) includes a near periodic annular arrangement of nanostructures (910), such that the second region (703) approximates the functionality of a locally periodic radial diffraction grating.

Example 2

This example includes any or all of the features of example 1, wherein: the array of first unit cells (820) includes a hexagonal array of the subwavelength spaced nanostructures (910).

Example 3

This example includes any or all of the features of example 1, wherein the array of first unit cells (820) has a duty cycle that varies as a function of a position of a respective one of the first unit cells (820) in the first array, relative to an optical axis of the metalens (700).

Example 4

This example includes any or all of the features of example 1, wherein: the array of first unit cells (820) is configured to impart a first type of approximation of a target hyperboloidal phase to light incident thereon; the array of second unit cells (830) is configured to impart a second type of approximation of the target hyperboloidal phase to light incident thereon; and the first type of approximation of the target hyperboloidal phase is different than the second type of approximation of the hyperboloidal phase.

Example 5

This example includes any or all of the features of example 4, wherein the second type of approximation of the target hyperboloidal phase is a sawtooth phase change.

Example 6

This example includes any or all of the features of example 1, wherein the hybrid multiregion collimating metalens (700) has a focal length less than 2 millimeters and a numerical aperture greater than 0.5.

Example 7

This example includes any or all of the features of example 6, wherein the hybrid multiregion collimating metalens (700) has a numerical aperture greater than or equal to about 0.8.

Example 8

This example includes any or all of the features of example 1, wherein the hybrid multiregion collimating metalens (700) has a lens transmission of greater than 80% for light in the visible region of the electromagnetic spectrum.

Example 9

This example includes any or all of the features of example 1, wherein at least one of the first region (701) and the second region (703) is configured as a notch pass filter for certain wavelengths of light incident on the wherein the hybrid multiregion collimating metalens (700).

Example 10

According to this example there is provided a lighting device (495, 595), including: a first light source (409, 502); and a collimating metalens (401, 501) proximate the first light source (409, 502), the collimating metalens (401, 501) being a hybrid multiregion collimating metalens (700) including: a substrate (303) having a first side (309) and second side (311); and a metasurface (305) formed on the first side (309), the metasurface (305) including a first region (701) extending radially around an optical axis of the metalens (401, 501) and a second region (703) extending radially around the first region (703); wherein: the first light source (409, 502) is configured to emit light rays (415, 503) in a first wavelength or wavelength range, at least a portion of the light rays (415, 503) being incident on the hybrid multiregion collimating metalens (700); the hybrid multiregion collimating metalens (700) is configured to collimate the light rays (415, 503), thereby producing collimated light rays (415, 503) in a region down field (DFR) of the hybrid multiregion collimating metalens (700), relative to the first light source (409, 502).

Example 11

This example includes any or all of the features of example 11. The lighting device (495, 595) of example 10, wherein: the first region (701) includes an array of first unit cells (820) containing subwavelength spaced nanostructures (910), such that the first region (701) functions as a subwavelength high contrast grating (SWHCG); the second region (703) includes an array of second unit cells (830), wherein the array of second unit cells (830) includes a near periodic annular arrangement of nanostructures (910), such that the second region (703) approximates the functionality of a locally periodic radial diffraction grating.

Example 12

This example includes any or all of the features of example 11, wherein: the array of first unit cells (820) includes a hexagonal array of the subwavelength spaced nanostructures (910).

Example 13

This example includes any or all of the features of example 11, wherein: the array of first unit cells (820) has a duty cycle that varies as a function of a position of a respective one of the first unit cells (820) in the first array, relative to an optical axis of the hybrid multiregion collimating metalens (700).

Example 14

This example includes any or all of the features of example 11, wherein: the array of first unit cells (820) is configured to impart a first type of approximation of a target hyperboloidal phase to light incident thereon; the array of second unit cells (830) is configured to impart a second type of approximation of the target hyperboloidal phase to light incident thereon; and the first type of approximation of the target hyperboloidal phase is different than the second type of approximation of the hyperboloidal phase.

Example 15

This example includes any or all of the features of example 13, wherein the second type of approximation of the target hyperboloidal phase is a sawtooth phase change.

Example 16

This example includes any or all of the features of example 11, wherein the hybrid multiregion collimating metalens (700)(700) has a focal length less than 2 millimeters and a numerical aperture greater than 0.5.

Example 17

This example includes any or all of the features of example 11, wherein the hybrid multiregion collimating metalens (700) has a numerical aperture greater than or equal to about 0.8.

Example 18

This example includes any or all of the features of example 11, wherein the hybrid multiregion collimating metalens (700) has a lens transmission of greater than 80% for light in the visible region of the electromagnetic spectrum.

Example 19

This example includes any or all of the features of example 10, wherein first light source is a light emitting diode or a wavelength converter.

Example 20

This example includes any or all of the features of example 10, wherein the lighting device (495, 595) is selected from the group consisting of an automotive lamp, a projector, a fiber illuminator, a flash, or a combination thereof.

Example 21

According to this example there is provided a laser assisted remote phosphor system (400), including: a light source (402); a wavelength converter (409); and a collimating metalens (401) including a first side and a second side; wherein: the light source (402) is configured to emit primary light rays (403), at least a portion of the primary light rays being incident on the wavelength converter (409); the wavelength converter (409) is configured to convert at least a portion of the primary light rays (403) incident thereon to secondary light rays (415); the collimating metalens (401) is positioned proximate to the wavelength converter (409) such that at least a portion of the secondary light rays (415) are incident on the first side of the collimating metalens (401); and the collimating metalens (401) is configured to collimate the secondary light rays (415), so as to produce collimated secondary light rays (415) in a region down field ("DFR") of the collimating metalens (401), relative to the wavelength converter (409).

Example 22

This example includes any or all of the features of example 21, further including a dichroic beam splitter (405), wherein: the light source (402) is configured to emit the primary light rays (403) towards the dichroic beam splitter (405); the dichroic beam splitter (405) is configured to reflect at least a portion of the primary light rays (403) such that they are incident on the second side of the collimating metalens (401); and the collimating metalens (401) configured to pass the primary light rays (403) or to focus the primary light rays (403) on the wavelength converter (409).

Example 23

This example includes any or all of the features of example 21, wherein: the wavelength converter (409) emits the secondary light rays (415) such that a first wave front of the secondary light rays (415) is incident on the first side of the collimating metalens (401); the collimating metalens (401) includes a metasurface (305) including an array of nanostructures (313), the metasurface (305) being configured to impart a phase change to the secondary light rays (415) incident thereon, such that the secondary light rays (415) in the region downstream (DFR) of the collimating metalens (401) have a second wave front; and the second wave front is different from the first wave front.

Example 24

This example includes any or all of the features of example 23, wherein the first wave front is a spherical wave front, and the second wave front is a plane wave.

Example 25

This example includes any or all of the features of example 21, wherein: the collimating metalens (401) includes a metasurface (305) configured to impart a phase change to the secondary light rays (415) incident thereon, the metasurface including an array of nanostructures (313); and the phase change imparted by the metasurface varies as a function of a distance from an optical axis of the collimating metalens.

Example 26

This example includes any or all of the features of example 21, wherein: the collimating metalens (401) is a hybrid multiregion metalens (700) including a first region (701) and a second region (703); the first region (701) extends radially around an optical axis of the collimating metalens (401), and includes an array of first unit cells (820) containing subwavelength spaced nanostructures (910), such that the first region (701) functions as a subwavelength high contrast grating (SWHCG); and the second region (703) extends radially around the first region (701) and includes an array of second unit cells (830), wherein the array of second unit cells (830) includes a near periodic annular arrangement of nanostructures (910), such that the second region (703) approximates the functionality of a locally periodic radial diffraction grating.

Example 27

This example includes any or all of the features of example 26, wherein the array of first unit cells (820) has a duty cycle that varies as a function of a position of a respective one of the first unit cells (820) in the first array, relative to an optical axis of the collimating metalens (401).

Example 28

This example includes any or all of the features of example 26, wherein: the array of first unit cells (820) is configured to impart a first type of approximation of a target hyperboloidal phase to the secondary light rays (415); the array of second unit cells (830) is configured to impart a second type of approximation of the target hyperboloidal phase to the secondary light rays; and the first type of approximation of the target hyperboloidal phase is different than the second type of approximation of the hyperboloidal phase.

Example 29

This example includes any or all of the features of example 28, wherein the second type of approximation of the target hyperboloidal phase is a sawtooth phase change.

Example 30

This example includes any or all of the features of example 21, wherein the collimating metalens (401) has a focal length less than 2 millimeters and a numerical aperture greater than 0.5.

Example 31

This example includes any or all of the features of example 30, wherein the collimating metalens (401) has a numerical aperture greater than or equal to about 0.8.

Example 32

This example includes any or all of the features of example 21, wherein the collimating metalens (401) has a lens transmission of greater than 80% for the secondary light rays (415).

Example 33

This example includes any or all of the features of example 22, wherein the secondary light rays (415) are in the visible region of the electromagnetic spectrum.

Example 34

According to this example there is provided a lighting device (495) including the laser assisted remote phosphor system (400) of any one of examples 21 to 33.

Example 35

This example includes any or all of the features of example 34, wherein the lighting device is selected from the group consisting of an automotive lamp, a projector, a fiber illuminator, a flash, or a combination thereof.

The following table correlates the reference numerals in the figures with their associated elements.

Table of Reference Numerals and Elements

| Reference Numeral | Element |
|---|---|
| 100 | LARP System |
| 101 | First light source |
| 103 | Rays |
| 105 | Dichroic barn splitter |
| 107 | Collimating optic |
| 109 | Wavelength converter |
| 111 | Substrate |
| 113 | Heat sink |
| 115 | Rays |
| 117 | Optional second light source |
| 119 | Rays |
| 121 | Focusing lens |
| 123 | Other components |
| 200 | Collimation system |
| 201 | Extended light source |
| 203 | Rays |
| 205 | Collimating optic |
| 207 | Optical axis |
| 301 | Metaleris |
| 303 | Substrate |
| 305 | Metasurface |
| 307 | Optional antireflective coating |
| 309 | First side |
| 311 | Second side |
| 313 | Nanostructures |
| 317 | Hemispherical wave front |
| 319 | Planar wave front |
| 350 | Optical axis |
| 400 | LARP system |
| 401 | Collimating metalens |
| 402 | First light source |
| 403 | Primary light rays |
| 405 | Dichroic beam splitter |
| 409 | Wavelength converter |
| 411 | Substrate |
| 413 | Heat sink |
| 415 | Secondary light rays |
| 417 | Optional second light source |
| 419 | Optional color channels |

Table of Reference Numerals and Elements

| Reference Numeral | Element |
|---|---|
| 421 | Focusing lens |
| 423 | Additional optics |
| 495 | Lighting device |
| 500 | Collimation system |
| 501 | Collimating metalens |
| 502 | Light source |
| 503 | Light rays |
| 507 | Optical axis |
| 595 | Lighting device |
| 700 | Multiregion metalens |
| 701 | First region |
| 703 | Second region |
| 750 | Metasurface |
| 820 | First unit cells |
| 830 | Second unit cells |
| 860 | Grain boundaries |
| 903 | Substrate |
| 910 | Nanopillars |
| 1050 | Destructive Resonance |
| 1100 | Metalens |
| 1103, 1105, 1107, 1109, 1111, 1113 | Annular subregion(s) |
| 1501, 1501, 1505 | Unit cell(s) |

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A collimating metalens (401), comprising:
   a substrate (303) having a first side (309) and a second side (311); and
   a metasurface (305) formed on said first side (309) of said substrate, the metasurface comprising at least one region (701);
   wherein:
   the at least one region (701) comprises an array of first unit cells (830), wherein the array of first unit cells (830) comprises an arrangement of nanostructures (910), such that each first unit cell (830) functions as a radial diffraction grating structure.

2. The collimating metalens (401) of claim 1, wherein said collimating metalens (401) has a numerical aperture greater than 0.5.

3. The collimating metalens (401) of claim 2, wherein said collimating metalens (401) has a numerical aperture greater than or equal to about 0.8.

4. The collimating metalens (401) of claim 1, wherein said collimating metalens (401) has a lens transmission of greater than 80% for light in the visible region of the electromagnetic spectrum.

5. The collimating metalens (401) of claim 1, wherein the at least one region (701) is configured as a notch pass filter for certain wavelengths of light incident on the collimating metalens (401).

6. The collimating metalens (401) of claim 1, wherein the at least one region (701) extends radially around an optical axis of said collimating metalens (401);
   the metasurface comprises a second region (703) extending radially around said at least one region (701); and the second one region (703) comprises an array of second unit cells (830), wherein the array of second unit cells (830) comprises a near periodic annular arrangement of nanostructures (910), such that the second region (703) approximates the functionality of a locally periodic radial diffraction grating.

7. A lighting device (495, 595), comprising:
a first light source (409, 502); and
a collimating metalens (401, 501) proximate said first light source (409, 502), said collimating metalens (401, 501) being a hybrid multiregion collimating metalens (700) comprising:
a substrate (303) having a first side (309) and a second side (311); and
a metasurface (305) formed on said first side (309), the metasurface (305) comprising a first region (701) extending radially around an optical axis of said metalens (401, 501) and a second region (703) extending radially around said first region (703);
wherein:
said first light source (409, 502) is configured to emit light rays (415, 503) in a first wavelength or wavelength range, at least a portion of said light rays (415, 503) being incident on said hybrid multiregion collimating metalens (700);
said hybrid multiregion collimating metalens (700) is configured to collimate said light rays (415, 503), thereby producing collimated light rays (415, 503) in a region down field (DFR) of said hybrid multiregion collimating metalens (700), relative to said first light source (409, 502);
wherein the first light source is a laser diode.

8. The lighting device (495, 595) of claim 7, wherein:
the first region (701) comprises an array of first unit cells (820) containing subwavelength spaced nanostructures (910), such that said first region (701) functions as a subwavelength high contrast grating (SWHCG); and
the second region (703) comprises an array of second unit cells (830), wherein the array of second unit cells (830) comprises a near periodic annular arrangement of nanostructures (910), such that the second region (703) approximates the functionality of a locally periodic radial diffraction grating.

9. The lighting device (495, 595) of claim 8, wherein:
the array of first unit cells (820) comprises a hexagonal array of said subwavelength spaced nanostructures (910).

10. The lighting device (495, 595) of claim 8, wherein:
the array of first unit cells (820) has a duty cycle that varies as a function of a position of a respective one of said first unit cells (820) in said first array, relative to an optical axis of said hybrid multiregion collimating metalens (700).

11. The lighting device (495, 595) of claim 8, wherein:
said array of first unit cells (820) is configured to impart a first type of approximation of a target hyperboloidal phase to light incident thereon;
said array of second unit cells (830) is configured to impart a second type of approximation of the target hyperboloidal phase to light incident thereon; and
the first type of approximation of the target hyperboloidal phase is different than the second type of approximation of the hyperboloidal phase.

12. The lighting device (495, 595) of claim 11, wherein the second type of approximation of the target hyperboloidal phase is a sawtooth phase change.

13. The lighting device (495, 595) of claim 8, wherein said hybrid multiregion collimating metalens (700) has a focal length less than 2 millimeters and a numerical aperture greater than 0.5.

14. The lighting device (495, 595) of claim 8, wherein said hybrid multiregion collimating metalens (700) has a numerical aperture greater than or equal to about 0.8.

15. The lighting device (495, 595) of claim 8, wherein said hybrid multiregion collimating metalens (700) has a lens transmission of greater than 80% for light in the visible region of the electromagnetic spectrum.

16. The lighting device (495, 595) of claim 7, wherein said lighting device (495, 595) is selected from the group consisting of an automotive lamp, a projector, a fiber illuminator, a flash, or a combination thereof.

17. A lighting device (495, 595), comprising:
a first light source (409, 502); and
a collimating metalens (401, 501) proximate said first light source (409, 502), said collimating metalens (401, 501) comprising:
a substrate (303) having a first side (309) and a second side (311); and
a metasurface (305) formed on said first side (309);
wherein:
said first light source (409, 502) is configured to emit light rays (415, 503) in a first wavelength or wavelength range, at least a portion of said light rays (415, 503) being incident on said collimating metalens (401);
said collimating metalens (401) is configured to collimate said light rays (415, 503), thereby producing collimated light rays (415, 503) in a region down field (DFR) of said collimating metalens (401, 501), relative to said first light source (409, 502); and
wherein:
the first light source emits light in the wavelength range of about 400 to about 700 nm; and
the metasurface (305) is formed of at least one material selected from the group of materials consisting of a high refractive index low-loss dielectric oxide; a high refractive index low-loss dielectric carbide; a high refractive index low-loss dielectric diamond; a high refractive index low-loss dielectric sulfide; a high refractive index low-loss dielectric nitride; a high-index silicone polymer; and a high-index acrylic polymer.

18. The lighting device (495, 595) of claim 17, wherein:
the collimating metalens (401, 501) is a hybrid multiregion collimating metalens (700); and
the metasurface (305) comprises a first region (701) extending radially around an optical axis of said metalens (401, 501) and a second region (703) extending radially around said first region (703).

19. The lighting device (495, 595) of claim 18, wherein:
the first region (701) comprises an array of first unit cells (820) containing subwavelength spaced nanostructures (910), such that said first region (701) functions as a subwavelength high contrast grating (SWHCG); and
the second region (703) comprises an array of second unit cells (830), wherein the array of second unit cells (830) comprises a near periodic annular arrangement of nanostructures (910), such that the second region (703) approximates the functionality of a locally periodic radial diffraction grating.

20. The lighting device (495, 595) of claim 19, wherein:
said array of first unit cells (820) is configured to impart a first type of approximation of a target hyperboloidal phase to light incident thereon;

said array of second unit cells (830) is configured to impart a second type of approximation of the target hyperboloidal phase to light incident thereon; and the first type of approximation of the target hyperboloidal phase is different than the second type of approximation of the hyperboloidal phase.

\* \* \* \* \*